(12) United States Patent
Das et al.

(10) Patent No.: US 7,703,075 B2
(45) Date of Patent: Apr. 20, 2010

(54) PROGRAMMABLE ANNOTATION INFERENCE

(75) Inventors: Manuvir Das, Sammamish, WA (US); Zhe Yang, Seattle, WA (US); Brian Hackett, Ithaca, NY (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/159,962

(22) Filed: Jun. 22, 2005

(65) Prior Publication Data

US 2006/0294502 A1 Dec. 28, 2006

(51) Int. Cl.
G06F 9/44 (2006.01)

(52) U.S. Cl. .................................. 717/123; 717/126

(58) Field of Classification Search .................. None
See application file for complete search history.

(56) References Cited

U.S. PATENT DOCUMENTS

| | | | |
|---|---|---|---|
| 5,822,588 A | 10/1998 | Sterling et al. | |
| 5,970,490 A * | 10/1999 | Morgenstern | 707/10 |
| 6,442,750 B1 | 8/2002 | Lopes et al. | |
| 7,013,458 B2 | 3/2006 | Bloch et al. | |
| 7,584,458 B2 | 9/2009 | Das et al. | |
| 2003/0041288 A1 | 2/2003 | Kolawa et al. | |
| 2003/0110472 A1 | 6/2003 | Alloing et al. | |
| 2005/0076331 A1 | 4/2005 | Das et al. | |
| 2006/0123017 A1* | 6/2006 | Berg et al. | 707/100 |
| 2006/0271917 A1 | 11/2006 | Das et al. | |

OTHER PUBLICATIONS

Alur et al., "Synthesis of Interface Specifications for Java Classes," *Proceedings of the 32nd ACM Symposium on Principles of Programming Languages*, 12 pp. (Jan. 2005).
Ammons et al., "Mining Specifications," In *Proceedings of the 29th ACM Symposium on Principles of Programming Languages*, Berlin, 13 pp. (2002).
Burdy et al., "An Overview of JML Tools and Applications," *Software Tools for Technology Transfer*, 21 pp. (Dec. 2004).
Das et al., "ESP: Path-Sensitive Program Verification in Polynomial Time," *Proceedings of the 2002 ACM SIGPLAN Conference on Programming Language Design and Implementation* (2002).
Detlefs et al., "Extended Static Checking," *Compaq Systems Research Center, Research Report 159*, 50 pp. (1998).
Dor et al., "CSSV: Towards a Realistic Tool for Statically Detecting All Buffer Overflows in C," In *Proceedings of the SIGPLAN 2003 Conference on Programming Language Design and Implementation*, pp. 155-167 (2003).

(Continued)

*Primary Examiner*—Tuan Q Dam
*Assistant Examiner*—Evral Bodden
(74) *Attorney, Agent, or Firm*—Klarquist Sparkman, LLP

(57) ABSTRACT

Techniques and tools relating to annotating program source code facilitate inferring annotations from source code based at least in part on a description (or specification) generated with a programmable tool. Described techniques and tools provide flexibility in annotation inference across different code bases and program states or properties of interest, and can reduce the overhead of adding annotations to "legacy" source code. For example, a specification is generated with a programmable specification tool that is separate from an inference engine. In the inference engine, one or more annotations for a computer program are inferred based at least in part on the specification.

19 Claims, 16 Drawing Sheets

OTHER PUBLICATIONS

Ernst et al., "Dynamically Discovering Likely Program Invariants to Support Program Evolution," *IEEE Transactions in Software Engineering*, 27(2):99-123 (2001).

Flanagan et al., "Houdini, an Annotation Assistant for ESC/Java," In *Symposium of Formal Methods*, 18 pp. (2001).

Flanagan et al., "Extended Static Checking for Java," *Proceedings of the 29th ACM Symposium on Principles of Programming Languages*, Berlin, 12 pp. (2002).

Foster et al., "A Theory of Type Qualifiers," *Proceedings of the SIGPLAN 1999 Conference on Programming Language Design and Implementation*, Atlanta, 12 pp. (1999).

Foster et al., "Flow-Sensitive Type Qualifiers," *Proceedings of the SIGPLAN 2002 Conference on Programming Language Design and Implementation*, Berlin, 12 pp. (2002).

Horn, "On Sentences Which are True of Direct Unions of Algebra," *Journal of Symbolic Logic*, 16(1):14-21 (1951).

Jackson, "Alloy: A Lightweight Object Modelling Notation," *ACM Transactions on Software Engineering and Methodology*, 11(2):256-290 (Apr. 2002) [document dated Nov. 27, 2001].

Nimmer et al., "Static Verification of Dynamically Detected Program Invariants: Integrating Daikon and ESC/Java," *Proceedings of RV'01, First Workshop on Runtime Verifications*, 22 pp. (2001).

Reps, "Demand Interprocedural Program Analysis Using Logic Databases," *Workshop on Programming with Logic Databases*, ILPS, 34 pp. (1993).

Reps et al., "Precise Interprocedural Dataflow Analysis via Graph Reachability," *Conference Record of the 22nd ACM Symposium on Principles of Programming Languages*, 13 pp. (1995).

Shankar et al., "Detecting Format String Vulnerabilities with Type Qualifiers," In *Proceedings of the 10th USENIX Security Symposium*, 16 pp. (2001).

Whaley et al., "Cloning-Based Context-Sensitive Pointer Alias Analysis Using Binary Decision Diagrams," *Proceedings of the SIGPLAN 2004 Conference on Programming Language Design and Implementation*, 14 pp. (Jun. 2004).

Whaley et al., "Automatic Extraction of Object-Oriented Component Interfaces," *Proceedings of the 2002 ACM SIGSOFT International Symposium on Software Testing and Analysis*, 11 pp. (2002) [document dated 2001].

Yang et al., "MECA: an Extensible, Expressive System and Language for Statically Checking Security Properties," *Proceedings of the 10th ACM Conference on Computer and Communications Security*, Washington, D.C., 14 pp. (2003).

Zhang et al., "Using CQUAL for Static Analysis of Authorization Hook Placement," *Proceedings of the 11th USENIX Security Symposium* (Aug. 2002) [document dated May 2002].

Buch et al., "A Static Analyzer for Finding Dynamic Programming Errors," Software: Practice and Experience, pp. 775-802 (2000).

Deline et al., "Typestates for Objects," ECOOP 04: 18th European Conf. on Object-oriented Programming, 26 pp. (Jun. 2004).

Dor et al., "Cleanness Checking of String Manipulations in C Programs via Integer Analysis," Proc. 8th Int'l. Static Analysis Symposium, 19 pp. (Jun. 2001).

Edwards, "Black-Box Testing Using Flowgraphs: An Experimental Assessment of Effectiveness and Automation Potential," Software Testing, Verification and Reliability, vol. 10, No. 4, pp. 249-262 (Dec. 2000).

Evans et al., "Improving Security Using Extensible Lightweight Static Analysis," IEEE Software, pp. 42-51 (Jan./Feb. 2002).

Evans et al., "LCLint: A Tool for Using Specifications to Check Code," SIGSOFT Symposium on the Foundations of Software Eng'g, 10 pp. (Dec. 1994).

Evans et al., "Splint Manual, Version 3.1.1-1," Secure Programming Group, University of Virginia Department of Computer Science, 121 pp. (Jun. 2003).

Evans et al., "Using Specifications to Check Source Code," TR-628, MIT Lab for Computer Science, 97 pp. (Jun. 1994).

Evans, "Static Detection of Dynamic Memory Errors," SIGPLAN Conf. on Programming Language & Design Implementation, Philadelphia, 10 pp. (May 1996).

Evans, "LCLint User's Guide, Version 2.5," U. of Virginia Dept. of Computer Science, 102 pp. (May 2000).

Guerreiro, "Simple Support for Design by Contract in C++," Proc. of the 39th Int'l Conf. and Exhibition on Technology of Object-Oriented Languages and Systems (TOOLS39), IEEE, 2001, pp. 24-34.

Guyer et al., "An Annotation Language for Optimizing Software Libraries," Proc. Second Conf. on Domain Specific Languages, Austin, Texas, 14 pp. (Oct. 1999).

Horning, "The Larch Shared Language: Some Open Problems," Compass/ADT Workshop, Oslo, Norway, 16 pp. (Sep. 1995).

Khurshid et al., "An Analyzable Annotation Language," OOPSLA '02, Seattle, Washington, 15 pp. (Nov. 2002).

Kramer, "Examples of Design by Contract in Java Using Contract, the Design by Contract™ Tool for Java™," Object World Berlin '99, Design & Components, 26 pp. (May 1999).

Larochelle et al., "Statistically Detecting Likely Buffer Overflow Vulnerabilities [slideshow]," 2001 USENIX Security Symposium, Washington D.C., 5 pp. (Aug. 2001).

Larochelle and Evans, "Statically detecting likely buffer overflow vulnerabilities," Proceedings of the 10th conference on USENIX Security Symposium, 14 pp. (Aug. 2001).

Leavens et al., "Enhancing the Pre- and Post-Condition Techniques for More Expressive Specifications," Technical Report TR97-19a, Iowa State University Department of Computer Science, 21 pp. (Sep. 1997; revised Feb. 1999).

Leavens et al., "Preliminary Design of JML," Technical Report 98-06v, Iowa State University Department of Computer Science, 94 pp. (document dated Jun. 1998-May 2003).

Leino, "Checking Correctness Properties of Object-oriented Programs," EEF Summer School on Specification, Refinement, and Verification, 49 pp. (Document dated Aug. 19, 2002).

Meyer, "Eiffel: Programming for Reusability and Extendibility," Feb. 1987, ACM, SIGPLAN Notices, vol. 22, No. 2, pp. 85-94.

Meyer, "Object-Oriented Software Construction," 2nd ed., Prentice Hall PTR, Upper Saddle River, NJ, 1997, pp. i, ii, 331-410.

Microsoft Corp., "Platform SDK: Microsoft Interface Definition Language (MIDL), Struct Attribute," 2 pp. [Downloaded from the World Wide Web on May 14, 2005] (document dated Mar. 2005).

Microsoft Corp., "Platform SDK: Microsoft Interface Definition Language (MIDL), Out Attribute," 2 pp. [Downloaded from the World Wide Web on May 16, 2005] (document dated Mar. 2005).

Microsoft Corp., "Platform SDK: Remote Procedure Call (RPC)," 1 p., [Downloaded from the World Wide Web on May 10, 2005] (document dated Mar. 2005).

Microsoft Corporation, "Scalable Program Analysis," 3 pp. [Downloaded from the World Wide Web on Sep. 5, 2003].

"Splint—Release 3.0.1," 2 pp. (document dated Jan. 2002-Jul. 2007) [downloaded from the World Wide Web on Aug. 8, 2007].

Wahls et al., "The Direct Execution of SPECS-C++: A Model-Based Specification Language for C++ Classes," Technical Report TR94-02b, Iowa State University Department of Computer Science, 52 pp. (Nov. 18, 1994).

* cited by examiner

```
void foo1 (int *p) {
    *p = 3;
} void foo2 (int *p) {
    if (*p != NULL) {
        *p = 3;
    }
}
```

```
void foo1 (__pre __notnull int *p) {
    *p = 3;
} void foo2 (__pre __maybenull int *p) {
    if (*p != NULL) {
        *p = 3;
    }
}
```

610 — Generate description with programmable description tool

620 — Receive description in annotation inference engine

630 — Infer annotation(s) on annotation target(s) in source code

Figure 7

| Annotations | Meaning |
|---|---|
| ∅ | *f* does not access *p*. |
| {*in*} | *f* only reads from *p*. *p* is null or points to initialized data. |
| {*out*} | *f* will initialize *\*p* if *p* is non-null. |
| {*in, out*} | *f* may freely read or write to *\*p*. *p* is null or points to initialized data. |
| {*req*} | *f* does not access *p*. *p* is non-null. |
| {*in, req*} | *f* only reads from *p*. *p* points to initialized data. |
| {*out, req*} | *f* will initialize *\*p*. *p* is non-null. |
| {*in, out, req*} | *f* may freely read or write to *\*p*. *p* points to initialized data. |

Figure 8

```
1:  void safe_strcat(char *a, char *b) {
2:     if (a && b)
3:        strcat(a, b);
4:  }
5:
6:  void strcat(char *a, char *b) {
7:     char *x = a;
8:     while (*x)
9:        x++;
10:    strcpy(x, b);
11: }
12:
13: void strcpy(char *a, char *b) {
14:    char *x = a;
15:    char *y = b;
16:    while (*y)
17:       *x++ = *y++;
18:    *x = 0;
19: }
```

Figure 9

| Clause Type | Clause | Derived Fact |
|---|---|---|
| source | $\Rightarrow access(p_8,\langle\text{'x'},\text{'read'},\text{'no'}\rangle)$ | $access(p_8,\langle\text{'x'},\text{'read'},\text{'no'}\rangle)$ |
| transition | $\forall k,c.access(p_8,\langle\text{'x'},k,c\rangle) \Rightarrow access(p_7,\langle\text{'a'},k,c\rangle)$ | $access(p_7,\langle a,\text{'read'},\text{'no'}\rangle)$ |
| annotation | $\forall p,c.access(p_7,\langle p,\text{'read'},c\rangle) \Rightarrow in(\langle\text{'strcat'},p\rangle)$ | $in(\langle\text{'strcat'},\text{'a'}\rangle)$ |
| annotation | $\forall p,k.access(p_7,\langle p,k,\text{'no'}\rangle) \Rightarrow req(\langle\text{'strcat'},p\rangle)$ | $req(\langle\text{'strcat'},\text{'a'}\rangle)$ |
| transition | $\forall k,c.access(p_7,\langle\text{'a'},k,c\rangle) \Rightarrow access(p_3,\langle\text{'a'},k,c\rangle)$ | $access(p_3,\langle\text{'a'},\text{'read'},\text{'no'}\rangle)$ |
| transition | $\forall k,c.access(p_3,\langle\text{'a'},k,c\rangle) \Rightarrow access(p_2,\langle\text{'a'},k,\text{'yes'}\rangle)$ | $access(p_2,\langle\text{'a'},\text{'read'},\text{'yes'}\rangle)$ |
| annotation | $\forall p,c.access(p_2,\langle p,\text{'read'},c\rangle) \Rightarrow in(\langle\text{'safe\_strcat'},p\rangle)$ | $in(\langle\text{'safe\_strcat'},\text{'a'}\rangle)$ |

Figure 11

$v \in$ Value $a \in$ Attribute $x \in$ Variable $X_p, X_a, X_s \in$ Name $p \in$ Pattern $p ::= \ * \ | \ v \ | \ x \ | \ a : p$ $\quad | \ \textbf{meet} \ \{p_1, \ldots, p_n\} \ | \ \textbf{join} \ \{p_1, \ldots, p_n\}$ $\quad | \ \textbf{not} \ p \ | \ X_p(\overline{p})$ $\langle pat \rangle ::= \textbf{pattern} \ X_p(\overline{x}) : p$ $\langle source \rangle ::= \textbf{source} \ \overline{p} \ \textbf{at} \ p \ [\textbf{for} \ \overline{x}]?$ $\langle trans \rangle ::= [\textbf{forward} \ | \ \textbf{backward}] \ \overline{p} \ \textbf{at} \ p \ [\textbf{for} \ \overline{x}]?$ $\langle annot \rangle ::= \textbf{annot} \ X_a(\overline{x}) : \overline{p} \ \textbf{at} \ p$ $\langle state \rangle ::= \textbf{state} \ X_s(\overline{x}) : \{[\langle source \rangle | \langle trans \rangle | \langle annot \rangle]^*\}$ $\langle spec \rangle ::= [\langle pat \rangle | \langle state \rangle]^*$

Figure 12

Figure 13

```
 1: pattern Offset(loc) :
 2:    or {val, and {KIND: 'INCR', LHS: val}}
 3: pattern Deref(loc) :
 4:    and {KIND: 'DEREF', LHS: Offset(loc)}
 5: pattern Assign(lhs,rhs) :
 6:    and {KIND: 'ASSIGN', LHS: lhs, RHS: rhs}
 7: pattern Branch(cond) :
 8:    and {KIND: 'BRANCH', COND: cond}
 9: pattern Entry(func) :
10:    and {ISENTRY: 'true', FUNCTION: func}
11:
12: state access(loc, kind, check) :
13: {
14:    source (val, 'read', 'no') at
15:      Branch(Deref(val)) for (val)
16:    source (val, 'read', 'no') at
17:      Assign(*, Deref(val)) for (val)
18:    source (val, 'write', 'no') at
19:      Assign(Deref(val), *) for (val)
20:
21:    backward (rhs, kind, check) at
22:      Assign(loc, rhs) for (rhs)
23:    backward (loc, kind, 'yes') at
24:      Branch(loc)
25:    backward (loc, kind, check) at
26:      not or {Assign(loc, *), Branch(loc)}
27:
28:    annot in(func, param) :
29:      (param, 'read', *) at Entry(func)
30:    annot out(func, param) :
31:      (param, 'write', *) at Entry(func)
32:    annot req(func, param) :
33:      (param, *, 'no') at Entry(func)
34: }"
```

```
1: void funcA(char *a) { // Bogus 'req'
2:    char *x = a;
3:    if (x)
4:       *a = 0;
5: }
6:
7: void funcB(char *a) { // Missed 'in' and 'req'
8:    char dx = *a - 'A';
9: }
```

| KFiles | MLOC | Analyzed | Soundness | Completeness |
|---|---|---|---|---|
| 10.9 | 5.3 | .85 ± .11 | 1.0 ± .11 | .68 ± .11 |
| 25.8 | 15.8 | .70 ± .14 | .96 ± .08 | .79 ± .09 |
| 11.6 | 6.4 | .75 ± .14 | .97 ± .12 | .72 ± .10 |
| Total: 48.3 | 27.5 | .73 ± .08 | .97 ± .04 | .75 ± .06 |

```
 1: pattern ElemStackBuf(buf, len) :
 2:   and {KIND: 'DECL', VAR: buf,
 3:        VAR: TYPE: and {KIND: 'array'
 4:                        ELEMCOUNT: len}}
 5:
 6: pattern ByteStackBuf(buf, len) :
 7:   and {KIND: 'DECL', VAR: buf,
 8:        VAR: TYPE: and {KIND: 'array'
 9:                        BYTECOUNT: len}}
10:
11: pattern HeapBuf(buf, len) :
12:   and {KIND: 'CALL', CALLEE: 'malloc',
13:        RETURNED: buf, ARG0: len}
14:
15: pattern Assign(lhs,rhs) :
16:   and {KIND: 'ASSIGN', LHS: lhs, RHS: rhs}
17:
18: pattern NoErase(buf, len) :
19:   not Assign(or {buf, len}, *)
20:
21: pattern Boundary(func) :
22:   and {FUNCTION: func,
23:        or {ISENTRY: 'true', ISEXIT: 'true'}}
24:
25: state buffer(buf, len, kind) :
26: {
```

```
27:     source (sbuf, slen, 'elem') at
28:       ElemStackBuf(sbuf, slen) for (sbuf, slen)
29:     source (sbuf, slen, 'byte') at
30:       ByteStackBuf(sbuf, slen) for (sbuf, slen)
31:     source (hbuf, hlen, 'byte') at
32:       HeapBuf(hbuf, hlen) for (hbuf, hlen)
33:
34:     forward (lhs, len, kind) at
35:       Assign(lhs, buf) for (lhs)
36:     forward (buf, lhs, kind) at
37:       Assign(lhs, len) for (lhs)
38:     forward (buf, len, kind) at
39:       NoErase(buf, len)
40:
41:     backward (rhs, len, kind) at
42:       Assign(buf, rhs) for (rhs)
43:     backward (buf, rhs, kind) at
44:       Assign(len, rhs) for (rhs)
45:     backward (buf, len, kind) at
46:       NoErase(buf, len)
47:
48:     annot ecount(func, buf, len) :
49:       (buf, len, 'elem') at Boundary(func)
50:     annot bcount(func, buf, len) :
51:       (buf, len, 'byte') at Boundary(func)
52:   }"
```

| KFiles | MLOC | Analyzed | Soundness | Completeness |
|---|---|---|---|---|
| 22.7 | 12.9 | .53 ± .18 | .73 ± .16 | .31 ± .18 |
| 11.6 | 6.4 | .87 ± .12 | .67 ± .17 | .73 ± .16 |
| 6.1 | 4.6 | .60 ± .18 | .80 ± .15 | .45 ± .18 |
| Total: 40.4 | 23.9 | .64 ± .10 | .72 ± .09 | .49 ± .11 |

Software 1980 with Annotation Inference
Techniques and Tools

PROGRAMMABLE ANNOTATION INFERENCE

BACKGROUND

As computer programs have become increasingly complex, the challenges of developing reliable software have become apparent. Modern software applications can contain millions of lines of code written by many different developers, and each developer may have different programming skills and styles. In addition, because many large applications are developed over a period of several years, the team of developers that begins work on an application may be different than the team that completes the project. Therefore, the original authors of software code may not be available to error-check and revise the code during the development process. For all of these reasons, despite recent improvements in software engineering techniques, debugging of software applications remains a daunting task.

The basic concepts of software engineering are familiar to those skilled in the art. For example, FIG. 1 shows a technique 100 for developing a computer program according to the prior art. First, at 110, a program is created/edited by one or more developers. Then, at 120, the program is debugged (e.g., using a debugging tool). At 130, if the program contains bugs to be fixed, or if other revisions are desired, the editing/debugging cycle continues. After debugging and editing, the source code is compiled into executable code. FIG. 2 shows a block diagram of a system for compiling source code according to the prior art. A compiler 200 compiles source code written in a high-level language in source files 205 into executable code 210 for execution on a computer. The executable code 210 can be hardware-specific or generic to multiple hardware platforms. The compiler 200 can use, for example, lexical analysis, syntax analysis, code generation and code optimization to translate the source code into executable code. In addition, many compilers have debugging capabilities for detecting and describing errors at compile time.

The size and complexity of most commercially valuable software applications have made detecting every programming error in such applications nearly impossible. To help manage software development and debugging tasks and to facilitate extensibility of large applications, software engineers have developed various techniques of analyzing, describing and/or documenting the behavior of programs to increase the number of bugs that can be found before a software product is sold or used. Such techniques include instrumentation, in which additional error-checking code is added to a program, and the writing of program specifications to describe the behavior of programs. Program specifications can be written in specially-designed specification languages, which follow their own syntactic rules for describing program behavior. However, specification languages are often complex, and writing a specification for a complex program can be similar in terms of programmer burden to re-writing the program in a new language.

As programs become larger and more complex, it becomes increasingly beneficial to split programs into modules whose behavior can be understood in isolation by programmers and verification tools. Annotations can be used to describe behavior of program modules (e.g., functions) and programs as a whole (e.g., when annotated modules are analyzed in combination) by making assertions about program states. Although annotations on source code help programmers and verification tools interpret the behavior of programs and program modules, the overhead of adding annotations to source code (particularly in the case of previously developed, or "legacy," source code) has limited their use. In addition, the set of properties that are important for analyzing program behavior varies widely across programs, as do the ways in which data flows within programs. For instance, locking behavior may be important for multi-threaded programs but not for sequential programs, while buffer size information may be important for programs written in C or C++ but not for programs written in Java or C#.

SUMMARY

Techniques and tools relating to annotating program source code are described. Described techniques and tools facilitate inferring annotations from source code based at least in part on a description (or specification) generated with a programmable tool. Described techniques and tools provide flexibility in annotation inference across different code bases and program states or properties of interest, and can reduce the overhead of adding annotations to "legacy" source code.

For example, in one technique, a specification is generated with a programmable specification tool. The specification is input to an inference engine, which is separate from the programmable specification tool. In the inference engine, one or more annotations for a computer program are inferred based at least in part on the specification. The annotations are then output from the inference engine. The specification can include, for example, information on states of interest in the computer program, propagation rules for searching the program for points at which the states of interest may apply, and annotation syntax rules for determining the form of the annotations.

This Summary is provided to introduce a selection of concepts in a simplified form that are further described below in the Detailed Description. This Summary is not intended to identify required features of the claimed subject matter or limit the scope of the claimed subject matter.

Various features and advantages will be made apparent from the following detailed description which proceeds with reference to the accompanying drawings.

BRIEF DESCRIPTION OF THE DRAWINGS

FIGS. 3A-B are code listings showing example annotations on functions having a pointer parameter.

FIG. 7 is a table showing example in, out, and req annotations for establishing explicit contracts in one implementation.

FIG. 8 is a code listing showing an example program with implicit contracts on pointer parameter usage.

FIG. 9 is a table showing example clauses and derivations for the example program of FIG. 8.

FIG. 11 is a table showing a specification syntax used in one implementation.

FIG. 12 is a table showing values matched by patterns p listed in FIG. 11.

FIG. 13 is a code listing showing a specification for pointer parameter usage in one implementation.

FIG. 14 is a code listing showing an example program with incorrect and incomplete annotations.

FIGS. 17A and 17B are code listings showing a simplified specification for identifying buffers with explicit sizes in one implementation.

DETAILED DESCRIPTION

Figure 1:
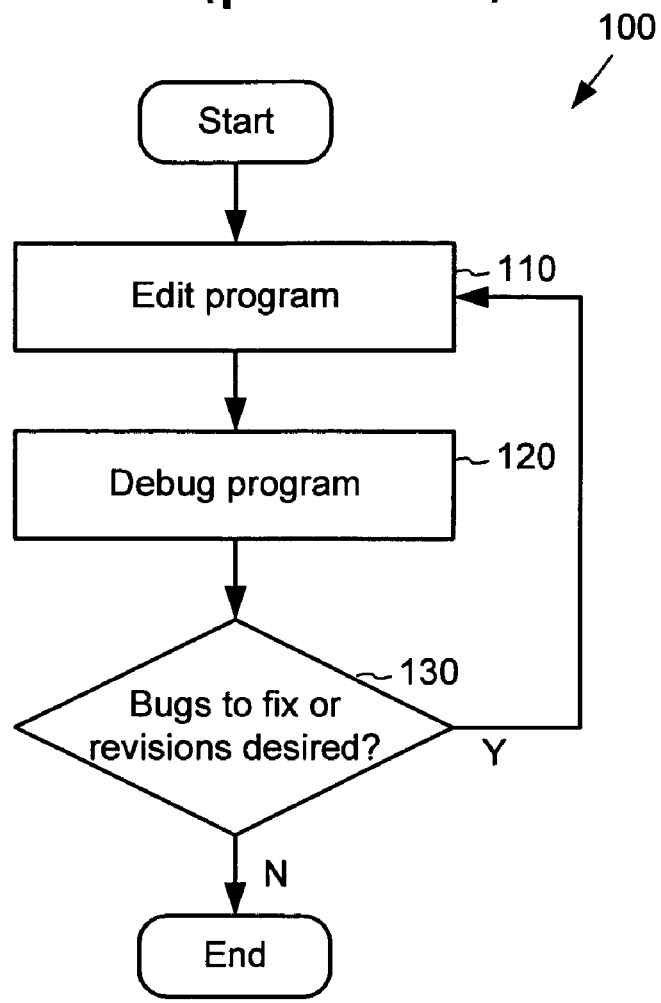
FIG. 1 is a flow diagram of a technique for creating a computer program according to the prior art.
Figure 2:
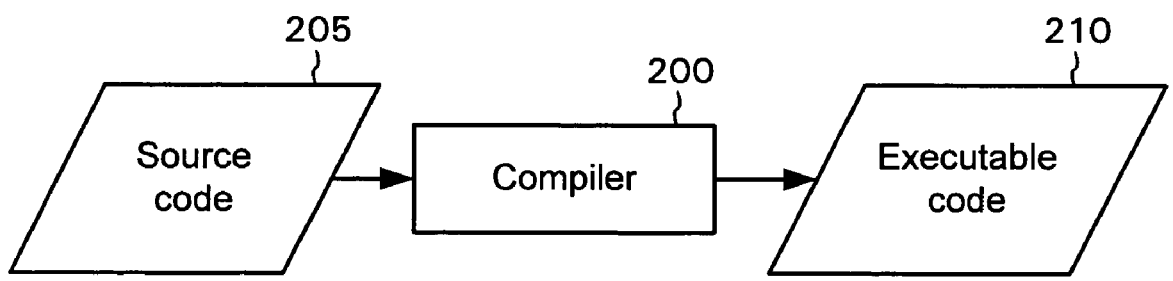
FIG. 2 is a block diagram of a system for compiling source code according to the prior art.

The following description is directed to techniques and tools for annotating program source code. Described techniques and tools facilitate inferring annotations from source code. For example, an inference engine infers annotations in source code based on a description generated with a programmable description tool. Different descriptions can be generated to infer annotations that describe various program properties on various code bases. Described techniques and tools can reduce program development overhead by, for example, reducing the overhead of adding annotations to legacy source code.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific annotations, annotation methods, and/or algorithmic details, other annotations, annotation methods, or variations on algorithmic details also can be used. As another example, described annotation inference tools can be modified relative to the examples described with reference to system diagrams by combining, adding, rearranging, or modifying system components. As another example, the implementations can be applied to other kinds of source code (e.g., other languages, data types, functions, interfaces, etc.), programming styles, and software designs (e.g., software designed for distributed computing, concurrent programs, etc.).

The various techniques and tools can be used in combination or independently. Different embodiments implement one or more of the described techniques and tools. Some techniques and tools described herein can be used in a source code annotation system, or in some other system not specifically limited to annotation of source code.

I. Annotation Overview

Annotations are added to programs to help describe program states. Annotations on source code can greatly improve the ability of programmers and defect detection tools to find programming errors. Annotations also can be used for other purposes (e.g., to describe programming interfaces such as platform APIs). Several annotation languages have been developed for annotating code.

An annotation typically comprises one or more annotation elements (which also can be referred to as keywords, tokens, etc.) in some sequence. Acceptable annotations can vary depending on the annotation and the annotation language used. For example, an annotation may contain a single element or several elements. Different grammar rules may be used to interpret the meaning of the annotation elements, and ordering of elements within an annotation may affect the meaning of the annotation.

Annotations can be placed on certain program artifacts called annotation targets. Possible categories of annotation targets include global variables (or, "globals"), formal parameters of functions, return values of functions, user defined types ("typedefs"), fields of structs, call sites and arbitrary expressions. Annotations also can be placed at arbitrary points in the control flow of the program to make assertions about the execution state, or on arbitrary data structures to make statements about invariants (i.e., properties of the data structure that always hold).

Described implementations can add annotations to one or more categories of annotation targets. For example, in order to support contracts for functions, annotation languages can provide precondition and postcondition annotations. Preconditions are properties of the program that hold in the "pre" state of the callee —the point in the execution when control is transferred to the callee. They typically describe expectations placed by the callee on the caller. Postconditions are properties of the program that hold in the "post" state of the callee— the point in the execution when control is transferred back to the caller. They typically describe expectations placed by the caller by the callee. Precondition and postcondition annotations can be placed, for example, on individual function parameters or on a return value.

Pseudocode 300 in FIG. 3A shows two functions with differing treatments of pointers that are passed as parameters to the functions. Function foo1 does not check whether pointer p is null before dereferencing it. On the other hand, function foo2 does check whether the pointer p is null before dereferencing it. Pseudocode 310 in FIG. 3B shows annotated functions foo1 and foo2. The annotated function foo1 shows that p is expected to be not null as a precondition of a call to foo1 (as indicated by the annotation "_pre_notnull"). On the other hand, the annotated function foo2 shows that p may be null when foo2 is called (as indicated by the annotation "_pre_maybenull") because the "nullness" of p is checked within foo2 prior to dereferencing p.

An annotation language may specify that certain annotations are assumed as default annotations. For example, a default annotation may be implied in the absence of any explicit annotations on an annotation target, or in addition to explicit annotations that do not contradict the default annotation. Described techniques and tools can be used in combination with default annotations. In addition, described techniques and tools can be used in place of or in combination with other tools that insert annotations in the code using different algorithms.

Annotated code can be checked for correctness with various checking tools. Such checking tools may include, for example, checking tools designed specifically to check code that has been annotated with one or more of the described annotation inference techniques and tools. Alternatively, some other checking tool may be used. The behavior of checking tools may depend on how various annotations are interpreted. For example, checking tool results may depend on whether a given annotation was inferred or was placed explicitly in the code by a programmer.

Example annotations that are used in some implementations are described below in Section III. A discussion of specific annotations in another source code annotation language that can be used with described techniques and tools is provided below in Section V. Other annotation languages also can be used. Although annotations specified in computer-readable annotation languages are used in some implementations, alternatively, annotations can be used that are based on ordinary spoken languages. For example, described techniques and tools can be used to generate English-language documentation for a program for use by a human reader.

Figure 4:
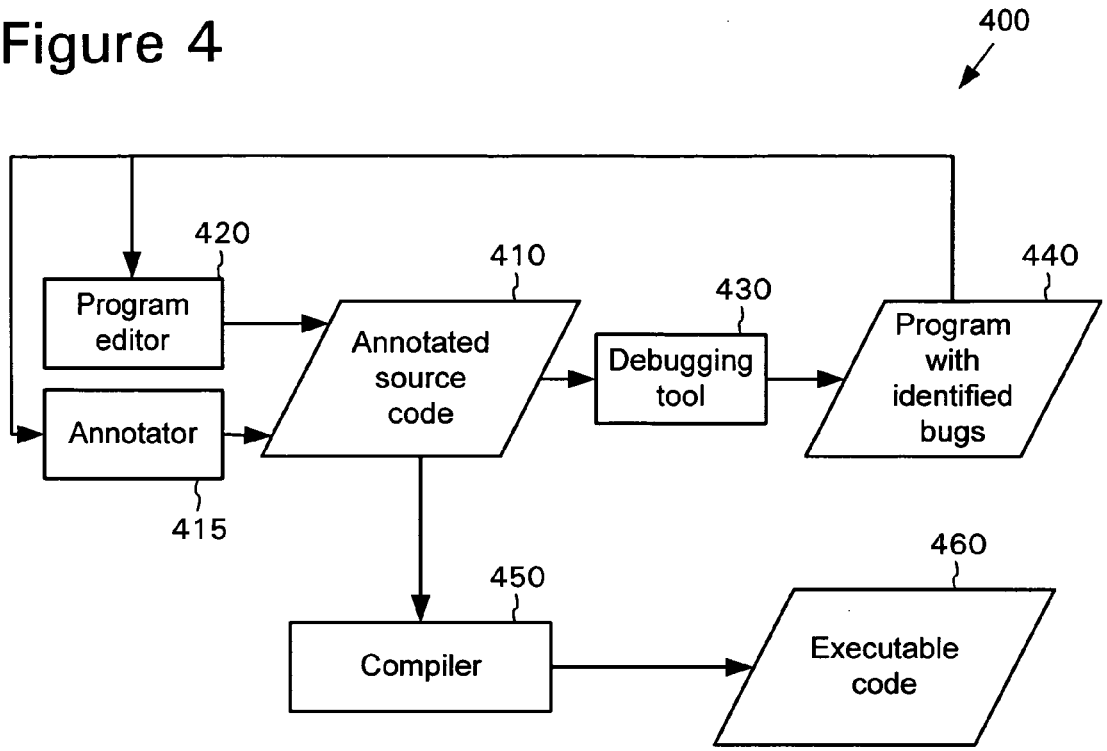
FIG. 4 is a block diagram of a source code annotation system.

FIG. 4 is a block diagram of a source code annotation system 400. The system 400 is designed to produce annotated source code 410 useful for producing a high-quality final software product. For example, a developer uses a program annotator 415 to create annotated source code 410 using a source code annotation language. In described implementations, the program annotator 415 is split into an annotation inference engine and a programmable description tool. (Implementations of annotation inference and programmable specification tools and techniques are described in further detail below.) The program annotator may be used in combination with a program editor 420 to edit the program source code before, during, or after annotation.

A developer can debug the annotated source code 410 using a debugging tool 430. The annotations in the annotated source code 410 facilitates detection of bugs that may be present in the source code. From a list of identified bugs 440, a developer can edit the source code using a program editor 420, and, if desired, annotate the edited code using annotator 415. The annotations in the annotated source code 410 allow the iterations of the editing/debugging cycle to be more productive.

When debugging is complete, a developer uses a compiler 450 to compile the source code into executable code 460. The compiler 450 may take annotations as input and perform further error-checking analysis at compile time. Or, the compiler 450 may ignore annotations in the annotated source code during compilation. The compiler 460 and the debugging tool 430 may alternatively be included in a combined debugging/compiling application.

II. Techniques and Tools for Programmable Annotation Inference

Although the addition of annotations to program source code has certain advantages, adding annotations to source code involves significant overhead in terms of programmer work time and resources. This is especially true when annotating previously developed "legacy" source code. The original programmers of an application often have the best knowledge of how the application should function. However, the original programmers may not be available to add annotations to source code after a program has been developed.

Accordingly, described techniques and tools relate to inferring annotations on a code base. For example, with a described programmable software tool, it is possible to describe desired annotations (e.g., annotations relating buffer characteristics, contracts between functions, failure codes, etc.) and then generate appropriate annotations in source code based on the description. Described techniques and tools can reduce overhead of adding annotations to source code.

States, or properties, describe a program at a particular point (e.g., a function call, return value, etc.). States may apply to particular data types or other program artifacts. For example, a state called "null" may be used to describe whether a pointer is null or not null. Propagation rules determine how an inference engine will "walk through" the program source code to determine where a particular state will apply. Annotation syntax rules are used to translate the states in the source code into annotations that can be read and interpreted (e.g., by a checking tool or a programmer) at locations in the source code determined by the propagation rules.

Other annotation inference tools check only for one property to infer from source code (e.g., checking for nullness of pointers to avoid dereferences of null pointers, but not checking for other properties that may be important to proper program behavior), or follow a fixed set of rules to determine whether a property applies at particular points in a program. With such inflexible tools, a new tool would have to be created for each new code base to be annotated, each new property to be checked, or each new annotation or annotation language.

Figure 5:
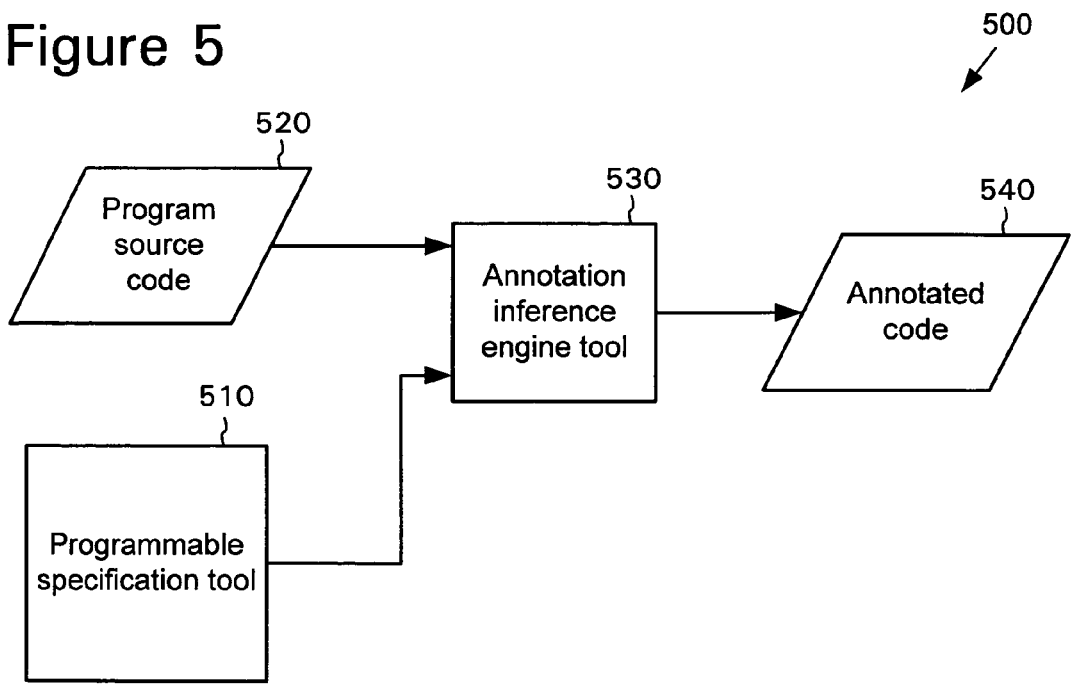
FIG. 5 is a block diagram of an annotation inference system according to some implementations.

FIG. 5 shows an example of an automatic annotation inference system 500 according to some implementations. A programmable tool 510 is used to generate a description (also referred to as a specification) that includes states (or, properties) of interest, propagation rules, and an annotation language syntax. The description may be in the form of one more files that can be read by the annotation inference engine tool. Annotation inference engine tool 530 takes the description and program source code 520 as input, and automatically infers annotations for the program source code based on the description. The annotations can then be added to the program source code 520 to produce annotated source code 540.

Figure 6:
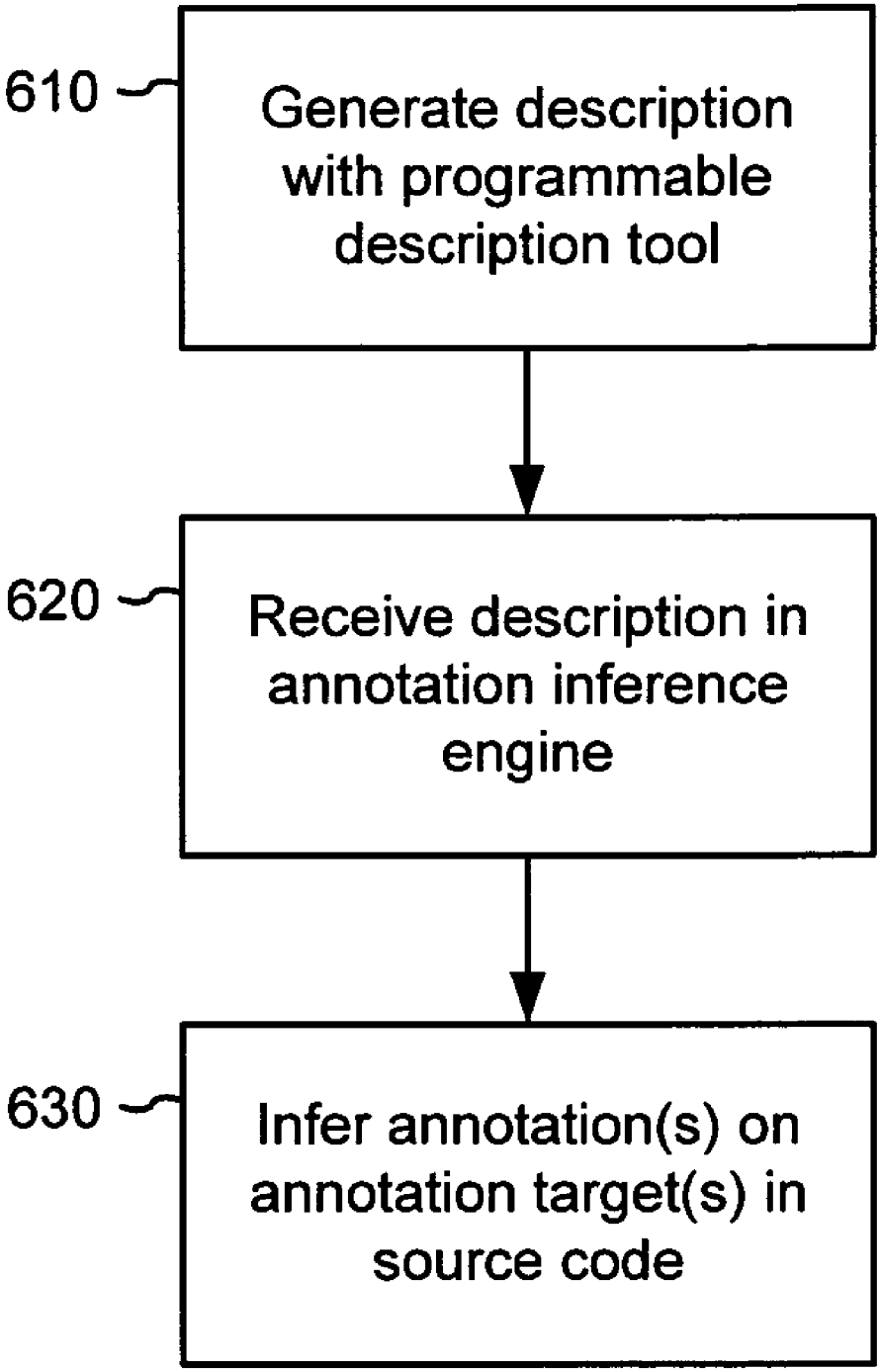
FIG. 6 is a flow chart showing a technique for inferring annotations in program source code using a programmable description tool according to some implementations.

For example, FIG. 6 shows a technique 600 for inferring annotations in program source code using a programmable description tool according to some implementations. At 610, a description is generated with a programmable description tool that is separate from the annotation inference engine. The description can include, for example, state information, propagation rules, and/or annotation syntax rules. At 620, the description is received in the annotation inference engine, and at 630, annotations are inferred at annotation targets in the source code. For example, the inferred annotations and their position in the source code can be based on the state information, inference rules, and/or propagation rules in the description.

The annotation inference engine tool 530 can be developed separately from the programmable tool 510. The programmable tool 510 can be used to generate descriptions tailored to specific code bases and states of interest without having to create a new inference engine. The annotation inference engine tool 530 need only be capable of reading and inferring annotations for the source code based on the description. In this way, programmers can tailor the automatic annotation inference system 500 via the programmable tool 510 to infer annotations for a variety of states and code bases.

The programmable tool 510 can include a user interface (e.g., a graphical user interface) that programmers can use to set states, propagation rules, and/or annotation syntax rules.

In one implementation, the annotation inference engine tool includes an algorithm that creates a directed graph of the program based on propagation rules in the description. The annotation inference engine tool uses the propagation rules to decide the nodes of interest in the graph where a particular state might apply. Then, the annotation inference engine tool uses the annotation syntax rules to generate annotations and place them in the source code.

In this way, a description generated with a programmable description tool replaces logic that would otherwise reside in the inference engine. By making the description programmable, the automatic annotation inference system 500 can be used to infer annotations for a variety of states and code bases using a variety of annotation languages.

Leaving inference rules open to modification allows a flexible inference system that can be tuned for performance, accuracy, and completeness, by modifying the specification. Described inference techniques can be applied to a code base gradually by adding new rules, removing rules, modifying rules, etc., in the specification. An inference technique that is used to analyze source code from buggy programs will tend to generate annotations that are inconsistent with proper program behavior, regardless of the soundness of the inference technique itself. Although annotation inference techniques may infer some inconsistent annotations and/or not infer all possible annotations, the flexibility of the described techniques and tools allows the soundness and completeness of an inference procedure to be refined through modification of the description.

III. Detailed Examples

This section provides a detailed explanation of principles underlying the described annotation inference and trace refinement techniques and tools, with reference to specific examples. Various implementations of the described techniques and tools are possible based on principles described in this section. In practice, various implementations of the described techniques and tools can differ in some respects from the specific examples described in this section. The techniques and tools can be used for automatic inference of a variety of annotations, including pointer parameter usage, buffer size relationships, trusted data, error handling, and resource obligations.

In the detailed examples provided in this section, an inference engine tool is used to interpret inference rules and apply annotations to the source code based on the inference rules. However, inference rules are not built in to the engine, but are specified by a user in a programmable specification. The programmable specification describes a domain of abstract states that may be derived at different program points, rules for generating abstract states from syntactic constructs in the source code, and rules (analogous to transfer functions) for pushing abstract states forwards and backwards through the control flow structure of the program. Although the specification is programmable, the inference performed in the inference engine tool based on the specification is automatic. States can be propagated both bottom-up and top-down through the call graph.

The programmable specification is used to transform a program into a proof system to obtain a set of rules that can be used to derive feasible program states and annotations. These clauses are applied using a graph reachability algorithm, resulting in a set of feasible program states and annotations. The graph reachability algorithm is scalable, and can be viewed as a flow-sensitive, context-insensitive, inter-procedural analysis. The performance, precision, and completeness of the inference can be tuned by altering the specification.

Annotation inference is used in conjunction with a separate error detection step in which a sound modular checker runs over the annotated program and reports violations of particular properties, such as buffer overruns. These violations are examined by programmers and are addressed by modifying the source code or by modifying inconsistent annotations, until no further violations are found. An alternative approach is to detect errors using global program analyses, which infer function summaries as part of the analysis. However, the two step approach described in this section has the advantage that it frees the inference engine from requirements of soundness, allowing it to be much more aggressive in inferring program behavior.

In order to quantify the effectiveness of annotation inference techniques, notions of "relative soundness" (fraction of inferred annotations that are correct) and "relative completeness" (fraction of all possible annotations that are inferred) are introduced. Both of these measures may be estimated by sampling from the inference results.

Described techniques have been used to automatically infer pointer parameter usage and buffer size annotations on millions of lines of industrial code. (Described techniques also can be used to automatically infer other properties.) Experiments on some code bases have shown that 75% of all possible pointer parameter usage annotations are able to be found in code, with a 3% error rate, and that 49% of all buffer parameter size annotations are able to be found in code, with a 28% error rate. However, different results may be possible under other conditions (e.g., different properties, different code bases, etc.) or when described techniques are combined with other techniques. For example, heuristics based on naming conventions may reduce the error rate in finding buffer parameter size annotations to less than 10%.

Described techniques also can be viewed as extending a type system with new types and inferring these types using flow-sensitive analysis.

A. Contract Annotations (in, out, and req)

In order to function correctly, programs with pointer parameters must obey implicit contracts on the values of these pointers, and the state of the memory they reference. Consider the task of automatically annotating a program so that these contracts are made explicit. We could annotate every pointer parameter as in (the parameter is either null or points to initialized data at function entry), out (the parameter is either null or points to memory that may be written to, and that is guaranteed to be initialized at function exit), or req (the parameter must not be null). The explicit contracts established by various combinations of these annotations are shown in FIG. 7. The annotations in FIG. 7 are assumed to apply to a parameter p of a function f.

We can automatically infer these annotations by deriving requirements from reads and writes through pointer variables in the source code, and then propagating these requirements backwards to parameters whose values flow to these pointer variables through assignments and function calls. In particular, any trace back from a write through a pointer to a pointer parameter identifies the parameter as out, any trace back from a read through a pointer to a pointer parameter without an intervening write marks the parameter as in, and any trace back from a read or a write through a pointer to a pointer parameter without an intervening null check marks the parameter as req.

For the program shown in pseudocode 800 in FIG. 8, by tracing back from the read through pointer x on line 8, parameter a of function strcat can be marked as in and req, and parameter a of function safe_strcat can be marked as in. From the writes through x on lines 17 and 18, parameter a of functions strcpy, strcat, and safe_strcat can be marked as out, and parameter a of strcpy and strcat can be marked as req. From the reads through y on lines 16 and 17, parameter b of strcpy, strcat, and safe_strcat can be marked as in, and parameter b of strcpy and strcat can be marked as req. These annotations fully describe the in/out/req contracts in this program.

B. Inference Procedure

This section describes an inference procedure using the program from FIG. 8 as a running example, and describes proof systems that the technique generates and resolves.

Given a code base and a specification, we first use the specification to translate the code base into a proof system. The proof system is a set of Horn clauses that derive annotations. We then resolve the proof system using a graph exploration algorithm, inferring all implied annotations.

1. Proof System Structure

The proof system generated from a program, given a specification, has five components:

state predicates: The form of individual states, or facts about program points.

annotation predicates: The form of individual annotations, which describe characteristics of programs.

source clauses: Axioms for deriving states.

transition clauses: Rules for deriving states from other states.

annotation clauses: Rules for deriving annotations from states.

The state and annotation predicates specify the form of facts used by the proof system. With a state predicate S, individual states take the form $S(p, \bar{v})$, where p is a program point and $\bar{v}$ is a vector of values with its length fixed by S. With an annotation predicate a, individual annotations take the form $A(\bar{v})$, where $\bar{v}$ has length fixed by a.

For example, using the in/out/req annotation example given above in Section III.A, one state predicate, access, and three annotation predicates, in, out, and req can be used.

access states take the form access (p, ⟨loc, kind, check⟩), with meanings as follows:

loc: The location will be accessed.

kind='write': A write will occur.

kind='read': A read will occur.

check='yes': A check against null will happen first.

check='no': No check will happen before the access.

Annotations are of the form in/out/req(⟨func, param⟩), indicating the function and parameter the annotation is attached to.

The proof system clauses are all first-order Horn clauses involving states and annotations, and take one of three simple forms. Source clauses are of the form $\Rightarrow$ s, and are axioms for deriving states. Transition clauses are of the form s $\Rightarrow$ s', and specify states that may be derived from a single other state. Annotation clauses are of the form s $\Rightarrow$ a, and specify annotations that may be derived from a single state. Transition and annotation clauses may be quantified over free variables. Transition clauses are automatically generated to model the assignments occurring at call and return sites from functions, enabling context-insensitive interprocedural propagation; all other clauses are derived using the user's specification.

For example, some clauses generated from the program in FIG. 8 are shown in the second column of FIG. 9. These and other clauses can be use to model the propagation of access information from each direct pointer access, back to when those pointers were passed in as formal parameters to some function. For each direct pointer access, there is a source clause deriving a feasible state at the program point immediately before. Transition clauses connect states at adjacent program points, follow assignments backwards, and set the check flag on edges that check pointers against the null property. There are annotation clauses for deriving each type of annotation on the parameters to each function, using the states at entry: out is derived from future writes on that parameter, in is derived from future reads, and req is derived from future unchecked accesses.

2. Proof System Resolution

One advantage of placing restrictions on the form of the generated clauses is a graph exploration algorithm can be used to perform all possible derivations and infer all annotations implied by the proof system. (In practice, the algorithm does not need to actually perform all possible derivations or infer all implied annotations.) Each rule deriving a state is of the form $\Rightarrow$ s or s $\Rightarrow$ s', and each rule deriving an annotation is of the form s $\Rightarrow$ a, so to derive any state or annotation we need to know about at most one state that we have already derived. Performing all possible derivations is then a matter of first performing all source clause derivations, and then exploring the space of states and annotations derivable from each of these using the transition and annotation clauses.

Figure 10:
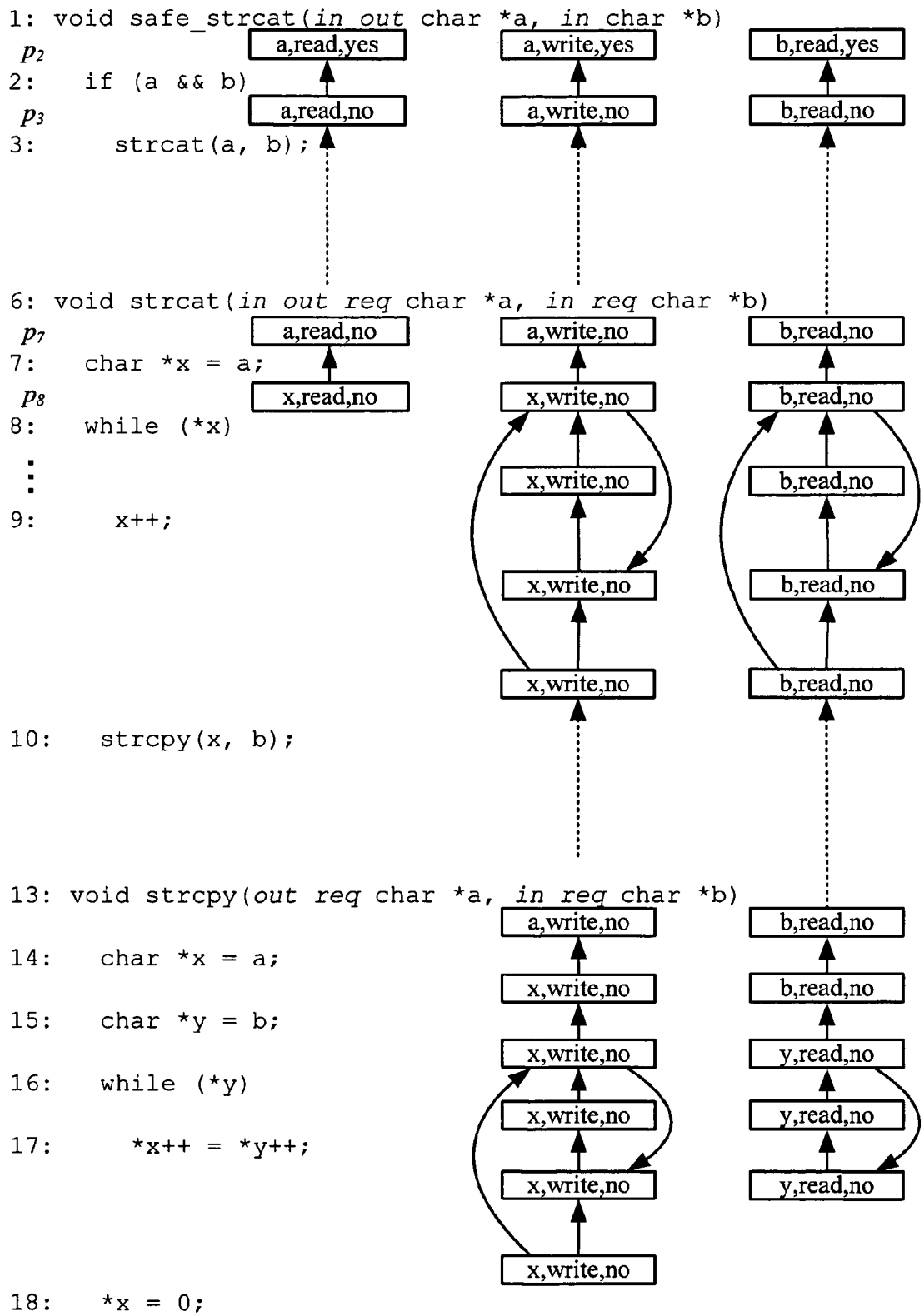
FIG. 10 is a code listing with flow graph showing an application of a described implementation of an annotation inference technique on the example program of FIG. 8.

The operation of the inference engine on the clauses for the program from FIG. 8 is shown in FIG. 10. In FIG. 10, inferred state predicates are shown in boxes alongside the program points at which they apply. Each box represents a feasible state derived at that program point, and edges indicate the operation of transition clauses to derive additional states. Inferred annotations are shown in italics on the function and parameter they correspond to. Consider, for example, the read through x performed by line 8. The derivations and associated clauses associated with this read are shown in table 900 in FIG. 9.

C. Specification Language

In this section we describe our specification language, and show how it can be used to translate a program into a proof system of the form given in the previous section.

The syntax of specifications is given in FIG. 11. ⟨state⟩ describes state predicates, and ⟨annot⟩ describes annotation predicates. Rules for generating clauses are given by ⟨source⟩, ⟨trans⟩, and ⟨annot⟩; these rules are expressed declaratively using patterns p∈ Pattern on states and the source program.

Patterns match against values v, which can be integers, strings, or program constructs (e.g., statements, expressions, types, etc.). Program construct values are taken apart using the function $A(v, a) \in 2^V$, which fetches the value(s) of a particular attribute a for a construct. There is a fixed set of attributes, which may fetch such things as the current function, the left or right side of an assign statement, or the children, opcode or type of an expression. Possible patterns p are shown in FIG. 11. Values matched by each pattern are shown in table 1200 in FIG. 12.

We now explain the components of a specification using our running example. A complete specification for the example is shown in pseudocode 1300 in FIG. 13.

As shown in pseudocode 1300, the state predicate access is given on line 12, specifying the state. The annotation predicates in, out, and req are given, respectively, on lines 28, 30, and 32. The predicates take the form described in Section III.B.1, above.

Predicates generated by a specification are invariant across all programs it can be applied to; the proof system clauses will necessarily vary. The source, transition, and annotation clauses can be specified by using patterns on the program syntax. Rules in the specification comprise a pattern on program statements which specifies when to generate clauses, and a pattern on state values which specifies the clauses to generate.

When applying a rule, a three step process can be performed on a statement:
1. Find the values of free variables for which the statement matches the rule's statement pattern.
2. Substitute these values back into the rule's value pattern.
3. Quantify over any remaining free variables, and add the corresponding clause.

Consider, for example, the clauses from FIG. 9. Rules for generating the source clauses are given on lines 14-19 of pseudocode 1300 in FIG. 13. The rule on lines 14-15 adds source clauses before each branch that tests the contents of a pointer, using a variable 'val' to match on any pointer. Consider the following process for the statement on line 8 of FIG. 8:

1. "while (*x)" matches Branch(Deref(val)) for val='x'
2. substitute 'x' for val in $\Rightarrow$ access($p_8$, ⟨val,'read','no'⟩)
3. add clause $\Rightarrow$ access($p_8$, ⟨'x', 'read', 'no'⟩)

Rules for generating transition clauses are given on lines 21-26 in FIG. 13. The rule on lines 21-22 adds transition clauses propagating information backwards through assignments. Patterns can be expressed in terms of the state following the assignment (the left side of the Horn clause), as well as a new variable ("rhs") for matching against all possible right hand sides. Consider the following process for the statement on line 7 of FIG. 8:

1. "x=a;" matches Assign(loc, rhs) for loc='x', rhs='a'
2. Substitute 'x' for loc and 'a' for rhs in access($p_8$, ⟨loc, kind, check⟩) $\Rightarrow$ access($p_7$, ⟨rhs, kind, check⟩)
3. Quantify over kind and check, and add $\forall$k, c.access ($p_8$, ⟨'x', k, c⟩) $\Rightarrow$ access($p_7$, ⟨'a', k, c⟩)

Rules for generating the annotation clauses are given on lines 29, 31, and 33 in FIG. 13. The rule on lines 29 adds annotation clauses for generating in annotations whenever a future read through a pointer variable may happen at entry to a function. Patterns can be expressed in terms of the annotation being derived (the right side of the Horn clause). Consider the following process for the statement on lines 7 of FIG. 8:

1. "x=a;" matches Entry(func) for func='strcat'
2. Substitute 'strcat' for func in access($p_7$, ⟨param, 'read', *⟩) $\Rightarrow$ in (⟨func, param⟩)
3. Quantify over param and check, and add $\forall$p,c.access ($p_7$, ⟨p, 'read',c⟩) $\Rightarrow$ in(⟨'strcat', p⟩)

This specification is partial, in the sense that the generated source and transition clauses will not be able to propagate all information backwards from all direct accesses in any program. For example, while the statement "a=*b++" is recognized as a read through b by the rules in the specification, the statement "a=*(b+1)" is not. Writing a robust specification is essential to both the coverage and the quality of the inferred annotations. The abstraction afforded by the keyword "pattern" allows for writing such specifications in a clean and maintainable fashion.

D. Applications

This section describes how a specification-based approach can be used to solve a variety of inference problems. For example, we show how a specification language can be used to describe annotation inference for a variety of program properties. Two metrics are described for evaluating the effectiveness of inference for these and other properties. Specifications also can be refined in order to improve the effectiveness of the inference.

1. Example Properties

In this section we show how specifications can be written for inference of a variety of properties, in terms of states, sources, transitions, and annotations.

a. Buffer Sizes

Unlike type-safe languages such as Java or C#, C and C++ do not provide a standard mechanism for accessing the allocated size of a buffer. This makes it difficult for programmers to add assertions guarding buffer accesses to their code. The typical programming solution is to use buffer/size parameter pairs to pass size information through a program. Annotations can be used to make these contracts explicit, for use by modular buffer overrun checkers.

A partial version of our specification for buffer sizes is given in FIGS. 17 and 17B and described in further detail below. Inference is triggered by knowledge about buffer/size pairs from allocation sites and string library functions. States are propagated via value flow to buffer and size parameters.
states: Potential buffer-size relationships.
sources: Stack and heap buffer allocation sites, annotations on string library functions.
transitions: Forward and backward propagation through assignments.
annotations: Inferred from function entry/exit states.

b. Return Error Codes

Functions vary in the way they indicate failure to their callers. Annotations that describe the possible failure codes for functions make the error-handling contracts explicit. By bootstrapping from more consistent error indicators, such as "errno" under a UNIX operating system and "SetLastError/GetLastError" under a Microsoft® Windows operating system, some of this information can be inferred.
states: An error code, where it may be stored, and whether it has been set.
sources: Any usage of a constant-valued error code.
transitions: Forward propagation through assignments and error code sets.
annotations: Inferred by correlating error code settings with constant return values.

c. Data Formatting

Data passed to or returned from a function may have specific formatting requirements. For example, a buffer of characters, integers, or pointers may need to be zero-terminated, a string may need to lack printf-style formatting characters, or a scalar value may need to have established upper and/or lower bounds. Annotations can be used to indicate requirements on data passed to a function and guarantees on data returned by a function. Requirements are generated by operations that expect data in a given format and are propagated by value flow.
states: Formatting requirements on data used later on.
sources: Operations that make assumptions about any data's format.
transitions: Backward propagation through assignments and any checks or writes that establish or affect the format.
annotations: Inferred from function entry/exit states.

d. Resource Obligations

When a program acquires resources, it typically incurs obligations to release them later. Possible obligations include freeing heap data, unlocking locks, and/or closing file handles. Annotations can be used to indicate obligations placed on a function through its input data, as well as obligations placed on a function's caller through its output data.

A difficulty in deciding what expressions hold obligations at any given point is that while assignments result in two expressions referencing the same resource, only one reference holds the obligation to release it. By tracing backwards from points where the resource is released, assignments become linear and this problem is avoided.

states: Obligations incurred on data stored at a location.
sources: Operations that discharge an obligation.
transitions: Backward propagation through assignments and operations that establish obligations.
annotations: Inferred from function entry/exit states.

2. Quantifying Effectiveness of Inference

In general, annotation inference procedures may be unsound, in that they infer inconsistent annotations, or incomplete, in that they do not infer all possible annotations. In described techniques, soundness and completeness of an inference procedure can be largely determined by the specification.

Given the specification in FIG. 13 and the example program illustrated in pseudocode 1400 in FIG. 14, our technique infers an incorrect req annotation on parameter a of funcA, and it does not infer in and req annotations on parameter a of funcB. Adding a source pattern for binary subtraction to the specification would introduce the desired annotations for funcB. Modeling discharge of a null check through data flow would eliminate the incorrect annotation on funcA.

A sound or complete specification can have drawbacks. For example, a sound specification may miss correct annotations, and a complete specification may infer bogus annotations. Therefore, the notions of relative soundness and relative completeness can be used to measure effectiveness of an "unsound" or "incomplete" specification. The relative soundness of a run is defined as the fraction of inferred annotations that are correct, while the relative completeness of a run is defined as the fraction of correct annotations that are inferred. Both of these measures can be estimated by sampling a set of results. For example, relative soundness can be estimated by taking a random sample of inferred annotations, and measuring the proportion that are correct. Relative completeness can be estimated by taking correct annotations from a random sample of functions, and measuring the proportion that are inferred.

Figure 15A:
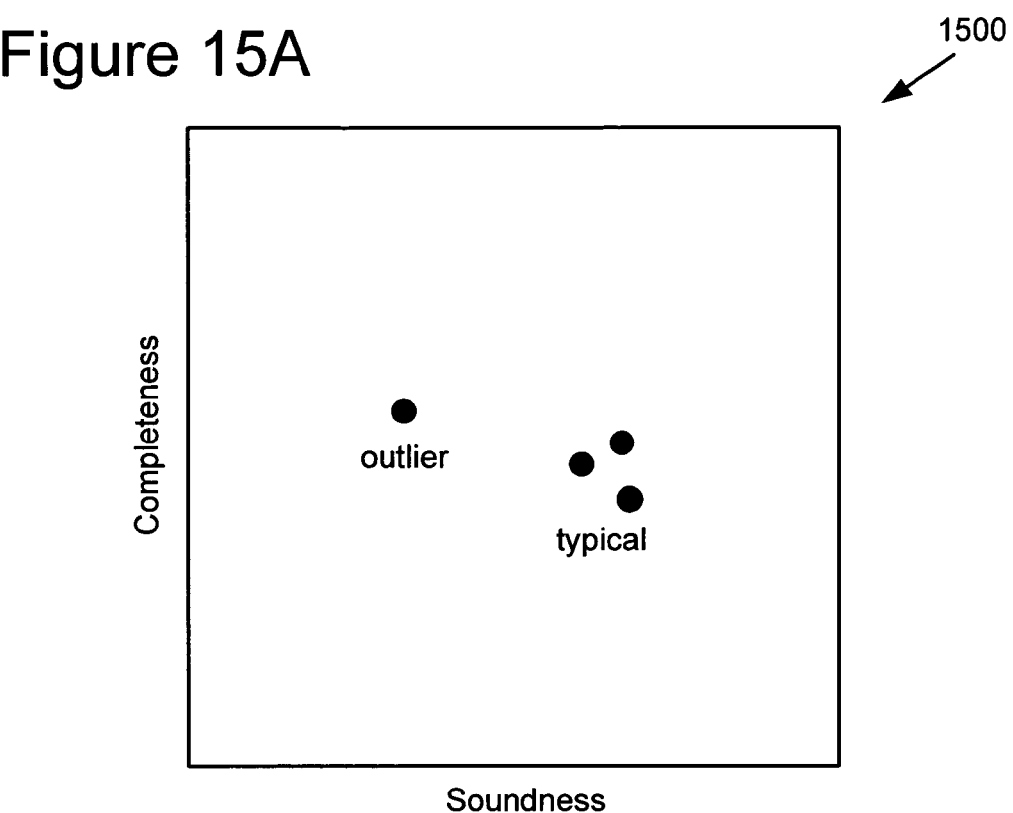
FIGS. 15A and 15B are graphs depicting effectiveness of annotation inference with different code bases and different specifications, respectively, in one implementation.

For our specification-based technique, we can graph completeness against soundness, with each point representing the effectiveness of the inference using a particular specification on a particular code base. For example, FIGS. 15A and 15B chart effectiveness of annotation inference in one implementation. FIG. 15A compares the same specification on different code bases, while FIG. 15B compares different specifications on the same code base.

If the specification for a given graph is fixed, as in graph 1500 in FIG. 15A, both the overall performance of the specification on a variety of code bases and the level of variability of the inference across code bases can be evaluated. If the code base is fixed, as in graph 1510 in FIG. 15B, the effectiveness of a series of alterations to the specification for a given property can be evaluated.

Figure 15B:
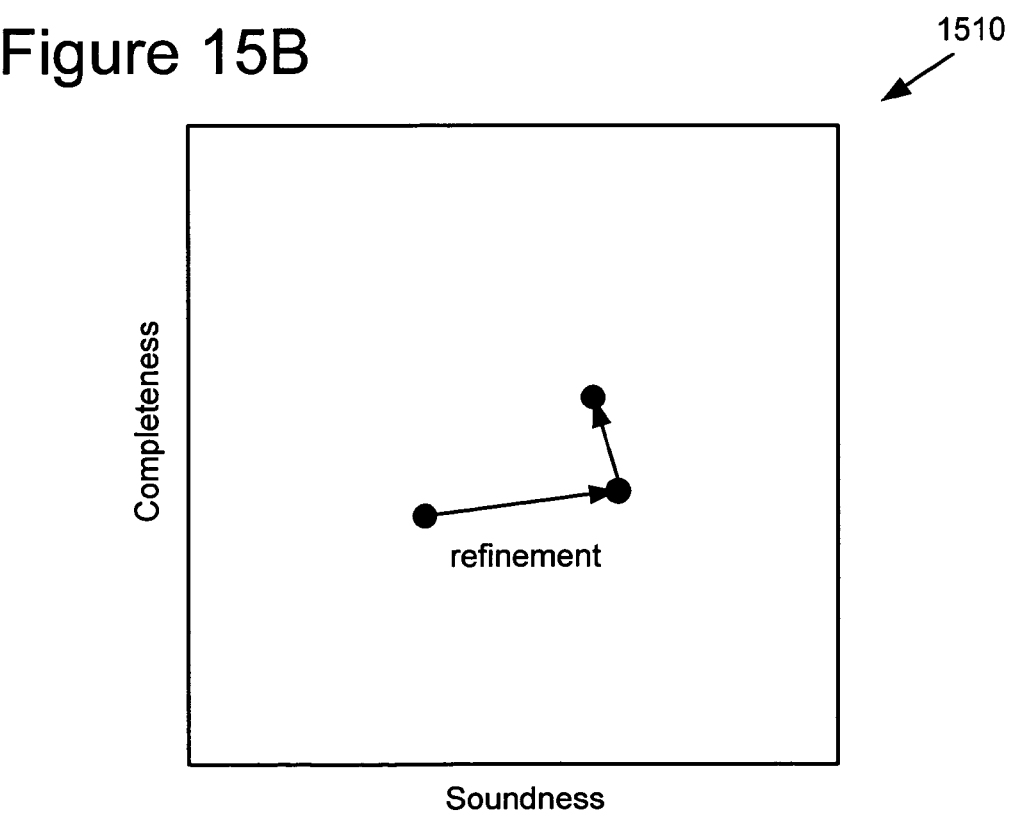

As shown in FIGS. 15A and 15B, adding clauses to a specification increases completeness at the cost of soundness, whereas removing clauses from a specification increases soundness at the cost of completeness.

3. Improving Effectiveness of Specifications

All proof system clauses are positive, in that they only increase the number of states and annotations that will be derived. Therefore, changing or adding rules to generate more clauses will increase completeness at the cost of soundness, whereas changing or removing rules to generate fewer clauses will increase soundness at the cost of completeness.

In our experience, the best way to strike a balance in refining a specification is to change rules to fix flaws uncovered by sampling the inference results for that specification.

Our inference engine associates annotations with witness traces, namely proofs that derive an annotation using a set of Horn clauses in the proof system. By examining traces for incorrect annotations, we can excise overly general clauses from the specification, provided that completeness is not unduly compromised. By checking the space of states derived during analysis, gaps in the proof system can be identified and fixed in the specification by adding new clauses, provided that soundness is not overly compromised.

Specification refinement in this fashion has its limits, however. A specification that is heavily refined for operation on a particular code base may lose generality and maintainability. Moreover, there are strict upper bounds on the attainable soundness and completeness of specifications for a property. Annotations document design facets of code bases, while only the raw source is available to the inference. Source code errors lead specifications to incorrect annotations, and incomplete source code prevents some annotations from being inferred. For example, forgotten null checks may give false req annotations, and no annotations will be inferred on stub functions that have not yet been implemented.

Observations indicate that a specification typically takes less than a day for an expert to initially develop, and will be most substantially improved through testing and refinement against a small but representative code base (10-100 KLOC (thousand lines of code)), over a period of two to three weeks.

E. Results

In this section, we present experimental results for two different inference problems. We evaluate the effectiveness of our approach for two properties, pointer parameter usage and buffer sizes. The results show effectiveness of the approach for the two properties and demonstrate that the approach is usable by code developers.

An inference engine has been implemented using the analysis infrastructure developed for the partial verification tool ESP. The infrastructure is designed to run on very large C/C++ code bases. Because information in the analysis may be propagated in any direction through the control flow of a program, it is insufficient to do a bottom-up traversal of the call graph. In order to analyze code bases that are too large to fit in memory, we take the following approach:

1. Divide the code base into "modules" of a few hundred files each.
2. Analyze each module separately, persisting to disk all states derived at function boundaries.
3. Reanalyze each module, using persisted states for calls across modules. Repeat as necessary.

Using this strategy, code bases containing millions of lines of code have been successfully analyzed. By running specifications for the two properties in parallel on seven desktop machines, over one hundred million lines of code spread over several separate code bases has been analyzed in five days. The inference yields 1.8 million distinct in/out/req annotations, and 120,000 distinct buffer annotations. Buffer annotations are buffer size relationships. For example, the size of buffer parameter buf can be given by the integer parameter len. (A run that considers all of the code bases together also could be performed.)

1. in/out/req

The specification for identifying in, out, and req parameters is similar to the one shown in FIG. 13. Differences are as follows:

1 A wider variety of dereference, assignment, and branch expressions are recognized.

2 Only reads that occur before any write are recognized, removing spurious in annotations.

3 Exploration on the call graph is restricted to bottom-up. This is accomplished by blocking forward propagation to the entry points of called functions.

Figures 16A, 16B:
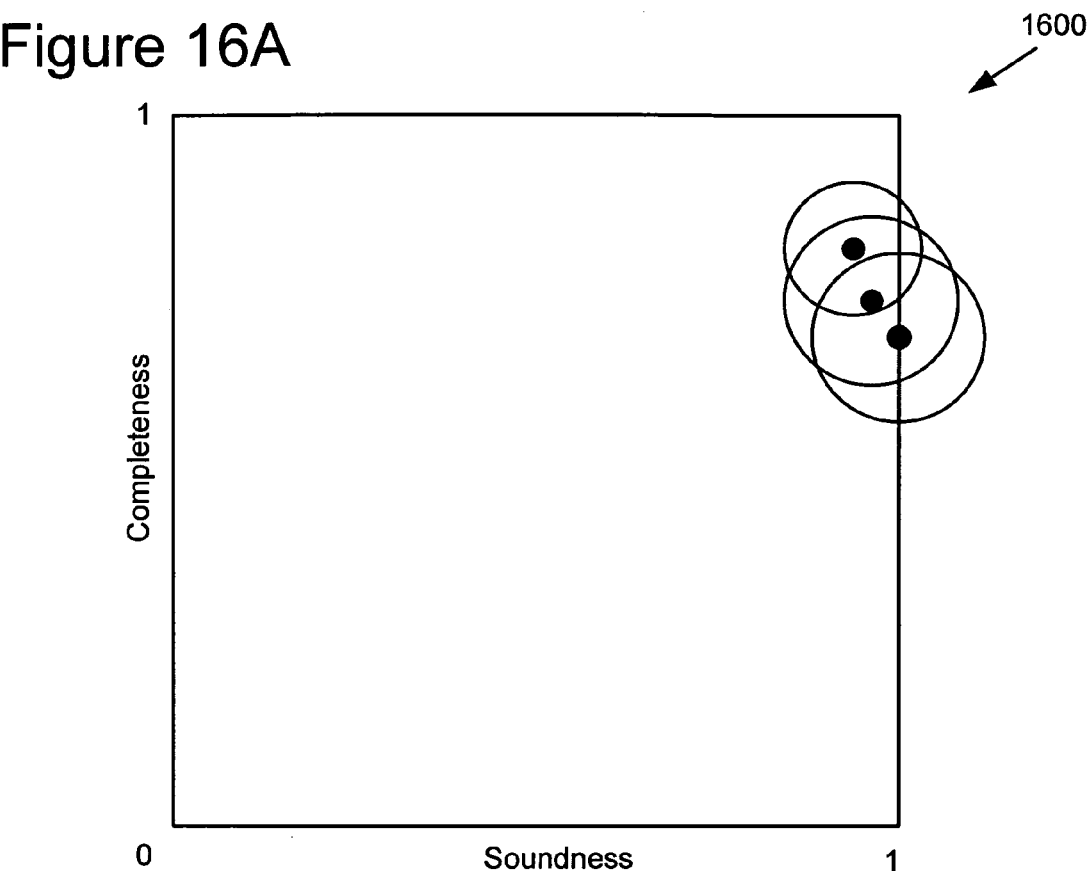
FIGS. 16A and 16B are a graph and table, respectively, showing experimental results of running the specification of FIG. 13 against three code bases in one implementation.

Results of running this specification against three large industrial code bases are shown in FIGS. 16A and 16B. For each code base, we used sampling to estimate the soundness and completeness of the inferred annotations, as described above. We also sampled to estimate the proportion of the code base we successfully analyzed. Failures to analyze part of the code base usually indicated part of the source that was not built, but could also arise from build failures or system failures later on, such as full hard disks. In FIG. 16A, graph 1600 plots completeness against soundness. The discs in the plot represent 95% confidence intervals for the samples. In FIG. 16B, table 1610 shows the fraction of the code base analyzed, soundness, and completeness of inference for pointer parameter usage over three industrial code bases.

Overall, it is estimated that 73% of the roughly 30 million lines of sampled code were analyzed, inferring 75% of the correct annotations with a 3% false positive rate. Most false negatives are due to separating code bases that may call into each other; the inference engine did not propagate information about modified parameters across such calls.

2. Buffer Sizes

A simplified version of a specification for identifying buffers with explicit sizes is shown in pseudocode 1700 and 1710 in FIGS. 17A and 17B. Rules for handling arithmetic have been left out of this specification.

This specification is much more aggressive than the specification for in/out/req. It propagates buffer/size information across almost any statement that could be construed as maintaining that relationship. There are then many potential sources of noise (in which the tool infers some behavior that is not actually true in the program) in this approach, as we are equating potential buffer/size pairs with definite buffer/size pairs. Good programming practices, however, imply that the two generally align, making inference results reliable.

We also tune the specification to recognize many special situations, such as accidental correlations (ignore small constant sizes) and polymorphic functions (ignore casts of the buffer and size into new types). The need for this kind of tuning motivated the specification based inference approach, which is the primary contribution of this paper.

Figures 18A, 18B:
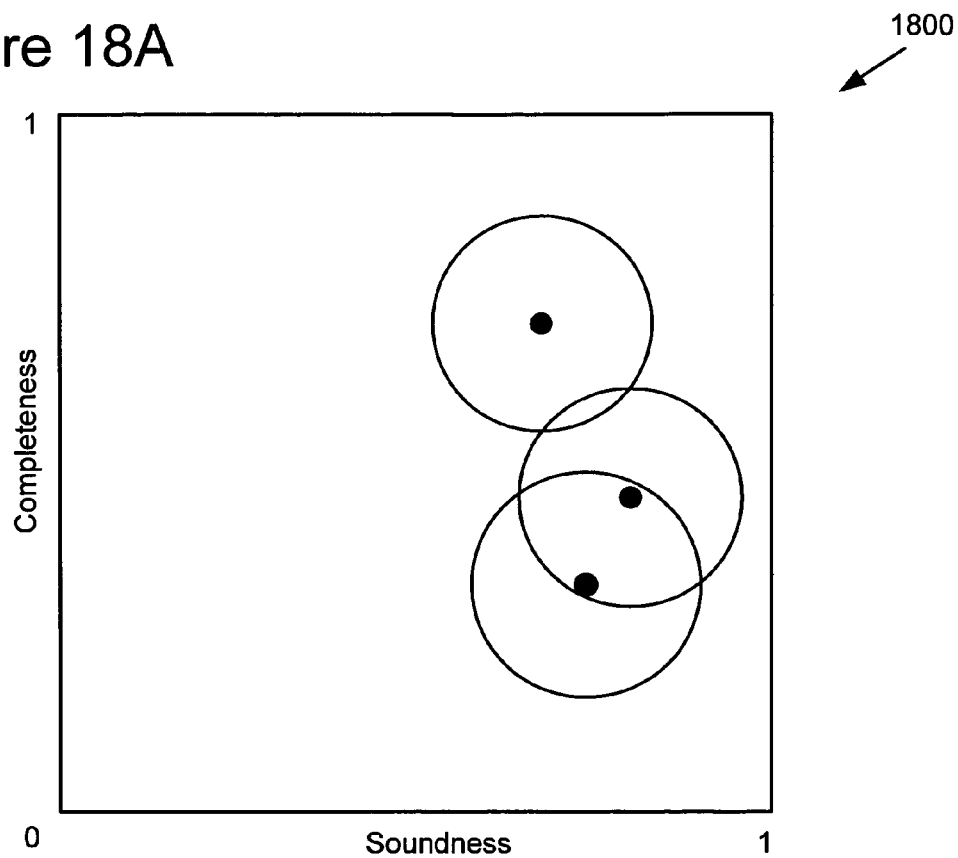
FIGS. 18A and 18B are a graph and table, respectively, showing experimental results of running the specification of FIGS. 17A and 17B against three code bases in one implementation.

Results of running the buffer size specification against several large code bases are shown in FIGS. 18A and 18B. In FIG. 18A, graph 1800 plots completeness against soundness. The discs in the plot represent 95% confidence intervals for the samples. In FIG. 18B, table 1810 shows the fraction of the code base analyzed, soundness, and completeness of inference for buffer/size parameter pairs over three industrial code bases.

Overall, it is estimated that 64% of the roughly 24 million lines of sampled code were analyzed, inferring 49% of the correct annotations with a 28% false positive rate. Most false negatives were due to complex pointer and size arithmetic that is not propagated across, isolated functions or groups of functions, and, as with in/out/req, separating code bases that call into one another. Most false positives were due to confusion between byte and element counts on a buffer, or between multiple buffers and multiple sizes. In practice, we can augment the specification with code base specific heuristics to do with type and naming conventions. These heuristics can reduce the false positive rate to less than 10%.

IV. Extensions

Described techniques and tools can be extended in various ways, or used in combination with other techniques and tools.

For example, context-sensitivity can be introduced by combining a state at function exit with the state at the call site, which can involve including clauses that require knowledge of multiple derived states (e.g. $s\hat{\ }s' \Rightarrow s''$). Relaxations on the forms of generated Horn clauses can increase an inference engine's capabilities while still allowing for scalability.

As another example, propagation may not be limited to propagating information along direct control flow edges of a program. This could expand inference from, for example, inferring that a structure's field can be null after seeing an assignment into it of a value known to be null, to propagating that inference to all other potentially null reads of that field in the code base.

As another example, statistical techniques may increase the overall quality of the inference. Source, transition, and annotation clauses indicate "beliefs" about a program's behavior. If such beliefs are treated probabilistically, long-shot guesses will only impact the results if they agree with other guesses, allowing for more aggressive propagation of information.

As another example, property specification of error detection tools could be extended to customize reasoning used by the defect detection analysis using principles described herein in the context of annotation inference.

As another example, described techniques and tools can be used in combination with an interface specification to describe and interface and then specify how a program uses the interface.

V. Example Annotation Language

In this example annotation language, annotations are described as parameter annotations (annotations for program parameters) or field annotations (annotations for program struct fields). This example annotation language includes properties, qualifiers, and constructions (e.g., begin/end). A single annotation may consist of several annotation elements.

The basic grammar for this example annotation language is shown below.

```
parameter-annot ::= [ pre | post [ (pred) ] basic_annot
field-annot ::= basic_annot
basic_annot ::= deref basic_annot
    | dot(field) basic_annot
    | index(number) basic_annot
    | offset(sizespec) basic_annot
    | begin basic_annot + end
    | atom_annot
atom_annot ::= p | except p
```

The parameter annotation (parameter-annot) grammar and the field annotation (field-annot) grammar each include a "basic" annotation element (basic-annot). The parameter annotation also includes an optional pre or post qualifier before the basic-annot element. The basic-annot element can be a qualifier followed by another basic-annot element (e.g., deref basic_annot, dot(field) basic_annot, etc.), a construction on another basic-annot element (e.g., begin basic_annot+ end, etc.), or an atomic annotation element (atom_annot). An atomic annotation element is either a property p or a property p preceded by an except qualifier.

The begin/end construction allows grouping of annotations such that common qualifiers can be factored. It is also useful in other situations (e.g., when defining C++ macros).

Boolean predicates (pred) can be used in conditional postconditions. The language of predicates is defined by the grammar below:

```
pred ::= constant-bool (can be either true or false)
       | location
       | pred bop pred (bop can be && or ||)
       | number rop number (rop can be <, <=, >, >=, ==, or !=)
       | begin basic_annot + end
       | atom_annot
```

A. Qualifiers in an Example Annotation Language

A qualifier is a prefix in an annotation that adds to the meaning of the annotation on an annotation target. Table 1 below lists and describes qualifiers in the annotation grammar described above.

TABLE 1

Qualifiers

| Qualifier | Meaning |
|---|---|
| pre | Prefixes an annotation to make it apply in the precondition state. |
| post [pred] | Prefixes an annotation to make it apply in the postcondition state. The optional boolean predicate pred makes the prefixed annotation conditional on pred. For example, a prefixed annotation conditional on the value of pred being true holds in the post state only if pred is also true. If no predicate is specified, it can default to true, making the postcondition unconditional. |
| deref | Annotates a pointer. The prefixed annotation applies one dereference down in the type. For example, if p points to a buffer, then the prefixed annotation applies to all elements in the buffer. |
| deref(size) | In some implementations deref takes an argument (size) that specifies the extent to which the prefixed annotation applies, size describes the indices for which the annotation applies. |
| dot(field) | Annotates a struct (or pointer to a struct). The prefixed annotation applies to the specified field only. |
| dot | Without a particular field, the prefixed annotation applies to all fields of the annotated struct. |
| index(number) | Annotates an array. The prefixed annotation applies to the specified indexed element only. Some possible valid number specifications are given below. |
| index | Without a particular index, the prefixed annotation applies to all valid indices of the annotated array. |
| offset(sizespec) | Annotates a pointer. If the prefixed annotation without the offset prefix would apply to a location L, then with the offset prefix it applies to the location L + sizespec (e.g., a byte offset). |

The pre and post qualifiers indicate whether a property is a precondition property or a postcondition property. In some implementations of the source code annotation language, properties of parameters apply in the "pre" state by default, whereas properties of the return value apply in the "post" state by default. The qualifiers pre and post are used to override these defaults.

The deref qualifier can be used to describe properties of objects that are reachable through one or more dereference operations on a formal parameter. In some implementations, a dereferencing qualifier also supports more general access paths, such as field references. Alternatively, an implicit deref can be introduced on all annotations on the reference.

deref can take an argument (size) that specifies the extent to which the prefixed annotation applies. For example, deref (size) can take the place of a readableTo qualifier. If no size is given, the annotation applies to index 0. The readableTo qualifier, specific applications of deref(size), and possible interpretations of size are described in further detail below.

The offset qualifier facilitates annotating buffers that have internal structure that is not apparent from their type. The offset qualifier is described in further detail below.

Table 2 below describes the except qualifier, which can modify or disambiguate an entire sequence of annotations.

TABLE 2

The except qualifier

| Qualifier | Meaning |
|---|---|
| except | Given a set of annotations Q containing except maybeP, the effect of except maybeP is to erase any occurrences of property P or notP (explicit or implied) within Q at the same |

TABLE 2-continued

The except qualifier

| Qualifier | Meaning |
|---|---|
| | level of dereferencing as except maybeP, and to replace them with maybeP. |

The except qualifier is an override that is useful in situations where macros are used to combine multiple properties, and two macros that are placed on the same program artifact conflict on some property. This conflict situation occurs frequently in annotated code.

B. Properties in an Example Annotation Language

In this example annotation language, a property P has corresponding properties notP and maybeP. Where P indicates that a given property holds, notP indicates that the property does not hold, and maybeP indicates that the property may or may not hold. Predefined properties relating two parameters (for instance, a buffer and its size) can be placed on one of the parameters while the name of the other parameter is given as an argument to the attribute.

The meanings of several properties are described below in Table 3.

TABLE 3

Properties

| Property | Meaning |
| --- | --- |
| init | Annotates any data item. States that the data item is initialized. Can be used in the form maybeinit to specify that certain fields need not be initialized. |
| null | Annotates a pointer. States that the pointer is null. |
| readonly | Annotates the contents of a location. States that the location is not modified after this point. If the annotation is placed on the precondition state of a function, the restriction only applies until the postcondition state. By default, all un-annotated locations are maybereadonly, that is, callers must assume the value may change. |
| checkReturn | Annotates a return value. States that the caller should inspect the return value. |
| state(S) | Annotates any data item. The properties of the data item are described by the specification struct S. Specification structs are described in detail below. |
| tainted(token) | Can be placed on any object.<br>The annotated object is tainted in a certain way, and must be checked before being used in certain ways.<br>token indicates how the object is checked (moved to an untainted state) and how it may be misused (e.g., passing a tainted object to a function with a precondition of untainted). Examples of token are "URL," etc.<br>A typical check function that removes possible taintedness will have a precondition of maybetainted and a postcondition of nottainted. The postcondition may be conditional (for instance, on the return value). |
| formatstring( start, style) | Annotates a function parameter. The annotated argument is to be interpreted as a format string. The start argument is a parameter index indicating the start of the parameters interpreted by the format string. The style argument indicates the style of format string, e.g., printf, or scanf. |
| entrypoint | Annotates a function/method. Indicates (e.g., to checking tools) that the annotated function is a programming interface (e.g., API) entry point. This is useful for inferring untrusted/tainted data. |
| range(min, max) | Annotates any scalar value and provides a range of validity. min and max are range-inclusive number expressions. |

As stated in Table 3, readonly annotates the contents of a location. For example, for a function interface foo(char *x), foo(_deref_readonly char *x)

states that the contents of the char buffer pointed to by the formal parameter x cannot be modified.

1. Buffer Properties

Annotations can be used to describe buffers. For example, the annotations offset, deref(size), readableTo and writableTo in this example annotation language all have applications to buffers. The writableTo and readableTo annotations state assumptions about how much space in a buffer is allocated and how much of a buffer is initialized. Such annotations include two main properties for buffers: the extent to which the buffer is writable (writableTo) and the extent to which the buffer is readable (readableTo). By stating assumptions about writableTo and readableTo extents at function prototypes, these annotations allow improved static checking of source code for buffer overruns.

As mentioned above, deref(size) can take the place of a readableTo qualifier. The deref(size) qualifier takes an argument that specifies the extent to which the prefixed annotation applies. For example, the annotation deref(size) init specifies that a number (size) of items are initialized.

The writableTo and readableTo properties are described below in Table 4.

TABLE 4

The writableTo and readableTo properties

| Property | Meaning |
| --- | --- |
| writableTo(size) | Annotates a buffer pointer or array. If the buffer can be modified, size describes how much of the buffer is writable (usually the allocation size), provided the buffer is not null. For a writer of the buffer, this is an explicit permission to write up to size, rather than a restriction to write only up to size (Possible size descriptions are described below.) |

TABLE 4-continued

The writableTo and readableTo properties

| Property | Meaning |
|---|---|
| readableTo(size) | Annotates a buffer pointer or array. The size describes how much of the buffer is readable, provided the buffer is not null. For a reader of the buffer, this is an explicit permission to read up to size, rather than a restriction to read only up to size. In some implementations, deref(size) can take the place of a readableTo qualifier. |

The writableTo property describes how far a buffer can be indexed for a write operation (provided that writes are allowed on the buffer to begin with). In other words, writableTo describes how much allocated space is in the buffer.

The readableTo property describes how much of a buffer is initialized and, therefore, how much of the buffer can be read. Properties of any elements being read can be described by annotations at the level of the element being read. A permission to read up to a certain element also implies permission to write up to that element, unless the property readonly applies.

The offset qualifier (see Table 1 above) facilitates annotating buffers that have internal structure that is not apparent from their type. For example, given a buffer that contains a leading 32-bit size followed by a null-terminated string, we can use offset to annotate the buffer's null-termination property as follows: offset(byteCount(4)) readableTo(sentinel (0)).

The writableTo and readableTo annotations are placed on the buffer pointer. For example, the annotation writableTo (byteCount(10)) can be placed on the buffer pointer for the function interface foo(char* buf) in the following manner:

foo(_writableTo(byteCount(10))char* buf)

The annotation states that the pointer "buf" points to memory of which at least 10 bytes are writable.

A buffer returned from an allocation function (e.g., a "malloc" function) starts with a known writableTo extent given by the allocation size, but the readableTo extent is empty. As the buffer is gradually initialized, the readableTo extent grows.

2. size, sizespec, number, and location

A size argument (e.g., of writableTo, readableTo, deref, etc.) can have several forms, or size specifications (sizespec). These are explained using the BNF grammar in Tables 5A-5C below. This grammar also describes location, which the property aliased (described below) also can take as an argument. For the purposes of this grammar, non-terminals are in italics, whereas literals are in non-italicized font.

TABLE 5A size argument grammar

| size | ::= | [ pre | post ] sizespec | The optional pre or post qualifier overrides the default store used to compute sizespec. The default store is the store in which the enclosing readableTo or writable To annotation is interpreted. |

TABLE 5B sizespec grammar

| sizespec | ::= | byteCount(number) | The size is given as a byte count. |
|---|---|---|---|
| | \| | elementCount(number) | The size is given as an element count. The size in bytes can be obtained by multiplying by the element size. |
| | \| | elementCount(number, elemsize) | The size is given as an element count. elemsize is a constant overriding the element size given by the C/C++ type. Useful for legacy interfaces with void*. |
| | \| | endpointer(location) | The size is given as an end pointer. The size in bytes can be obtained by subtracting the buffer pointer from location, and multiplying by the element size. |
| | \| | internalpointer(location) | The size is given as an internal pointer. endpointer and internalpointer provide the same information on readable and writable extent, but provide different information on the relative position of the two pointers. The distinction is useful when internalpointer is used as a refinement of the aliased property. |
| | \| | sentinel(constant-int) | The size is given by the position of the first occurrence of a sentinel value, starting at the element pointed to by the buffer pointer. constant-int is the sentinel value (usually 0). The size in bytes can be obtained by subtracting the buffer pointer from the pointer to the first occurrence of the sentinel value, adding 1, and multiplying by the element size. Implies that there is at least one occurrence of the sentinel value in the buffer. |

TABLE 5C

*number grammar*

| number | ::= | constant-int | |
|---|---|---|---|
| | \| | location | |
| | \| | number op number | op is either +, −, *, or /. |
| | \| | − number | |
| | \| | sizeof(C/C++-type) | The compile-time constant given by the C/C++ sizeof construct. |
| | \| | readableBytes(location) | The number is obtained by taking the readable bytes of location, which must denote a buffer. |
| | \| | writableBytes(location) | The number is obtained by taking the writable bytes of location, which must denote a buffer. |
| | \| | readableElements(location) | The number is obtained by taking the readable elements of location, which must denote a buffer. |
| | \| | writableElements(location) | The number is obtained by taking the writable elements of location, which must denote a buffer. |

TABLE 5D

*location grammar*

| location | ::= | variable | Usually a parameter. |
|---|---|---|---|
| | | ( pre\|post ) location | The pre/post qualification modifies the interpretation of the prefixed location, such that memory lookups implied by the location are performed either in the pre or the post state of a function call. |
| | | return | Special name; refers to the return value. |
| | | * location [ { const } ] | Dereference operation. The optional constant integer in braces states how many bytes to read in the dereference and overrides the implicit size provided by the type of location. |
| | | field | Refers to a field with an implicit struct, e.g., when referring to another field in a struct from within the struct |
| | | location .field | Refers to the particular field of the given location. |
| | | location [ number ] | Refers to the particular indexed field of the buffer or array denoted by location. |
| | | location ( +\|− ) const | Specifies a location obtained as an offset from another location. |
| | | ( location ) | Explicit parentheses around location expressions to disambiguate. |
| | | explicitarraylength | Special name; in the context of an embedded array, refers to the declared array size. |
| | | implicitloc | Special name; refers to the location being annotated. For example, if implicitloc appears inside a number inside a sizespec inside a readableTo annotation on a parameter p, then implicitloc refers to p. To determine the implicit location, offset prefixes (if present) are taken into account. |

The grammar in Tables 5A-5D presents several semantic possibilities for the size argument.

In described implementations, null-terminated buffers are declared using the sentinel size specification. For instance, the property readableTo(sentinel(0)) describes a buffer that must contain a 0, and whose readable size extends at least as far as the buffer element that holds the first 0.

Size specifications can be used to annotate buffers with an implicit structure that is not apparent in the buffer's declared type.

3. aliased/notaliased

The aliased(location) property is useful for transferring buffer properties from one pointer to another. The notaliased (location) property is useful for guaranteeing that two buffers are not aliased (i.e., that two buffers do not overlap). The aliased property is described in Table 6 below.

TABLE 6

*The aliased property*

| Property | Meaning |
|---|---|
| aliased(location) | Annotates a buffer pointer and states that the pointer points into the same logical buffer as location. The pointers need not be equal. |
| aliased | Annotates a pointer. States that the pointer could be aliased to other reachable objects. Can be used in the form notaliased to state that the pointer is not aliased with any other pointers reachable in the current dynamic scope. |

The sizespecs endpointer and internalpointer (see Table 5B above) can be used to refine the aliased annotation. aliased(q) on a pointer p states that p and q point into the same buffer.

Additionally, readableTo(internalpointer(q)) on a pointer p states that p is less than or equal to q.

C. States for Data Structures in an Example Annotation Language

In this example annotation language, we can specify that a particular data structure is in state S by adding the annotation state(S). Annotations called specification structs can be used to describe states of more complex data structures. (Specification structs are distinguished from structs in C/C++ program source code, which are referred to herein as "program structs.") Further, a qualifier called whenState can be used to indicate that an annotation on a field of a program struct applies in some state.

One state that is often of interest is the "valid" state, which indicates usability of the annotation target. Although a primitive property valid can be used to indicate whether an annotation target is in a valid state, using primitive properties in this way to describe states is limited to whatever such primitives are predefined in the annotation language. Annotations such as state(S) and specification structs allow not only distinguishing valid from non-valid data items, but distinguishing an arbitrary set of states of a data item.

1. Specification Struct Annotations

A specification struct is a struct (a data structure comprising one or more fields) that is used as an annotation. Specification structs provide flexibility for describing program states. For example, specification structs can be used to describe properties of entire program structs or one or more fields of a program struct.

In some implementations, the following annotations are used with specification structs.

TABLE 7

Annotations for specification structs

| Annotation | Meaning |
|---|---|
| spec | Annotates a struct definition and marks it as a specification struct. |
| specoverride(S) | Annotates a struct definition and marks it as a specification struct. It inherits all definitions from specification struct S, but explicit field definitions override inherited definitions. |
| specprojection(S) | Annotates a struct definition and marks it as a specification struct. Any listed fields without annotations obtain their annotations from specification struct S. Any listed fields with annotations obtain only those annotations, and no annotations inherited from S. Any non-listed fields have no annotations. |
| pattern | Used on field declarations in specification structs to mark the field as a type pattern. A type pattern applies to any field with the given type. Typedef names are matched by name, not by structure. Special predefined typedefs (e.g., SAL_ANY_POINTER, SAL_ANY_SCALAR, SAL_ANY_STRUCT, SAL_ANY_ARRAY) can be used as wild card matches for the corresponding class of types. |

These annotations are described in further detail below.

Annotations used with specification structs need not be limited to the set described above. Other implementations may use additional annotations, omit some annotations, vary the definition of annotations, etc.

2. Naming Conventions for States of Data Structures

As mentioned above, we can specify that a particular data structure is in state S by adding the annotation state(S). For example, we can specify that a particular data structure is in state RPCinit by adding the annotation state(RPCinit). An annotation state(X) can be associated with specification structs via the following name convention: if the annotated type is T, then we first check if there is a specification struct called T_when_X. This allows a specific specification struct to apply to a particular data structure. If no such specification struct exists, we use a specification struct called X.

The next section explains how the use of type patterns allows writing specification structs that apply to many different data structures.

3. Type Patterns in Specification Structs

Type patterns facilitate describing properties of many different data structures using a single specification struct. With type patterns, we can provide annotations for any field that has a particular type.

A type pattern is a field declaration with the following form:

pattern[annotations] type fieldname

The pattern annotation distinguishes the pattern from actual field specifications. type is the actual type pattern. Any C/C++ type can serve as a type pattern. fieldname (which could also be referred to as a pattern name) names the pattern.

4. States for Arbitrary Types

In addition to states for describing properties of program structs, states for describing properties of other types (e.g., pointers, scalars, etc.) are described. For example, the patterns introduced above allow interpretation of states of data types other than program structs. For example, _state(NonNullPointers)int *pInt;

applies the state NonNullPointers to a pointer "pInt" of type int *. This can provide one or more annotations for "pInt" by finding a pattern in NonNulPointers that matches the type int *.

5. Recursive Propagation

Annotations can be used to propagate annotations through pointer dereferences, field accesses, etc. For example type patterns can be used to propagate an annotation through pointer dereferences and through program struct field accesses.

6. Overriding Existing Specification Structs

To define a new specification struct based on an existing specification struct SPEC, a specification struct can be annotated with specoverride(SPEC) instead of just the annotation spec. With this annotation, fields provided explicitly in the new specification struct replace the corresponding ones from SPEC; any field not explicitly defined obtains its definition from SPEC.

7. Projections of Existing Specification Structs

With the annotation specprojection(SPEC) on a specification struct, a field explicitly listed in the annotated specification struct obtains corresponding annotations from SPEC; non-declared fields have no annotation.

8. whenState(S)

The qualifier whenState can be used to annotate a field of data structure. For example, in one implementation whenState(S) indicates that the qualified field annotation applies only in state S. The whenState qualifier makes it possible to describe field invariants for particular states without having to define specification structs.

D. Success and Failure Annotations for Functions

Many functions fall in the category of having a successful outcome that can be distinguished from some failure outcomes.

Accordingly, some implementations use a success annotation that can be declared on a function. If a function is annotated with a success condition, the unqualified postconditions apply only in the success case. A failure qualifier also can be used to abbreviate the conditional postcondition of the negation of the success condition.

Table 8 shows annotations relating to success and failure conditions.

invention may be implemented in diverse general-purpose or special-purpose computing environments.

Figure 19:
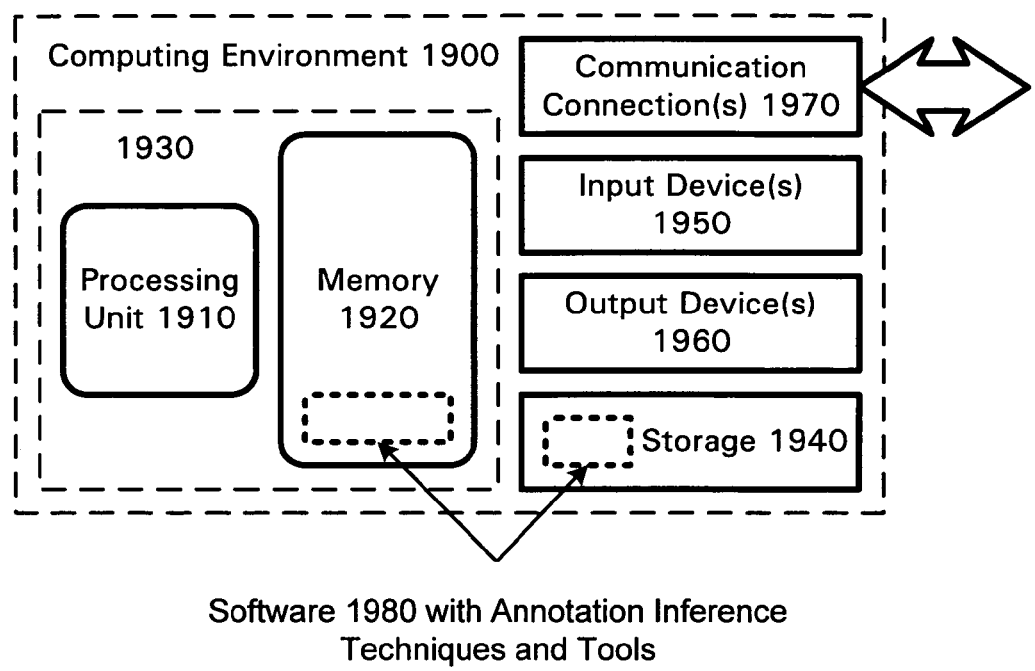
FIG. 19 is a block diagram of a suitable computing environment for implementing techniques and tools for annotation inference.

With reference to FIG. 19, the computing environment 1900 includes at least one processing unit 1910 and memory 1920. In FIG. 19, this most basic configuration 1930 is included within a dashed line. The processing unit 1910 executes computer-executable instructions and may be a real or a virtual processor. In a multi-processing system, multiple processing units execute computer-executable instructions to increase processing power. The memory 1920 may be volatile memory (e.g., registers, cache, RAM), non-volatile memory (e.g., ROM, EEPROM, flash memory, etc.), or some combination of the two. The memory 1920 stores software 1980 implementing one or more of the described techniques and tools.

A computing environment may have additional features. For example, the computing environment 1900 includes storage 1940, one or more input devices 1950, one or more output devices 1960, and one or more communication connections 1970. An interconnection mechanism (not shown) such as a bus, controller, or network interconnects the components of the computing environment 1900. Typically, operating system software (not shown) provides an operating environment for other software executing in the computing environment 1900, and coordinates activities of the components of the computing environment 1900.

TABLE 8

Annotations Relating to Success and Failure Conditions

| Annotation | Meaning |
|---|---|
| success [(pred)] | Declares the success predicate pred that indicates in the post condition whether or not the function was successful. This is used in conjunction with post annotations on parameters and results of this function to make these post conditions apply only to the success case. (See description of post below.) |
| post [(pred)] | Prefixes an annotation to make it apply in the postcondition state. The optional boolean predicate pred makes the prefixed annotation conditional on pred. In other words, the annotation only holds in the post state if pred is also true. If no predicate is specified, it defaults to true, making the postcondition unconditional, except in the case where the annotated function has a success(pred) declaration. In that case, post P is equivalent to post(pred) P. |
| failure | Prefixes an annotation to make it apply in the postcondition state whenever the success condition of the function is not met. Can only be used if the function on which this qualifier appears has a success(S) annotation. In that case, failure P is equivalent to post(!S) P. The annotation itself can appear wherever the post qualifier can appear. |

VI. Computing Environment

The techniques and tools described above can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software 1980 executing within a computer or other computing environment, such as shown in FIG. 19.

FIG. 19 illustrates a generalized example of a suitable computing environment 1900 in which the described techniques and tools can be implemented. The computing environment 1900 is not intended to suggest any limitation as to scope of use or functionality of the invention, as the present The storage 1940 may be removable or non-removable, and includes magnetic disks, magnetic tapes or cassettes, CD-ROMs, CD-RWs, DVDs, or any other medium which can be used to store information and which can be accessed within the computing environment 1900. For example, the storage 1940 stores instructions for implementing software 1980.

The input device(s) 1950 may be a touch input device such as a keyboard, mouse, pen, or trackball, a voice input device, a scanning device, or another device that provides input to the computing environment 1900. For audio, the input device(s) 1950 may be a sound card or similar device that accepts audio input in analog or digital form, or a CD-ROM reader that provides audio samples to the computing environment. The output device(s) 1960 may be a display, printer, speaker, CD-writer, or another device that provides output from the computing environment 1900.

The communication connection(s) 1970 enable communication over a communication medium to another computing entity. The communication medium conveys information such as computer-executable instructions, audio/video or other media information, or other data in a modulated data signal. By way of example, and not limitation, communication media include wired or wireless techniques implemented with an electrical, optical, RF, infrared, acoustic, or other carrier.

The techniques and tools described herein can be described in the general context of computer-readable media. Computer-readable media are any available media that can be accessed within a computing environment. By way of example, and not limitation, with the computing environment 1900, computer-readable media include memory 1920, storage 1940, communication media, and combinations of any of the above.

Some of the techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired. Computer-executable instructions may be executed within a local or distributed computing environment.

Having described and illustrated the principles of our innovations in the detailed description and the accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a method of annotating computer program source code stored on a computer-readable medium, the method comprising:
   receiving the computer program source code, wherein the computer program source code comprises a plurality of program statements;
   receiving a specification, wherein the specification comprises one or more rules comprising a program statement pattern that specifies when to generate clauses, and a state values pattern that specifies clauses to generate;
   in a computer, applying the specification to the computer program source code, wherein the applying generates a plurality of clauses;
   based on the plurality of clauses, inferring one or more annotations for the computer program source code; and
   annotating the computer program source code with the one or more annotations;
   wherein the inferring comprises performing (a)-(d) on at least one given program statement for a given rule out of the one or more rules applied responsive to determining that the given program statement matches the program statement pattern of the given rule, wherein the given program statement comprises a branch statement, an assignment statement, or a function entry statement:
   (a) in the given program statement, finding one or more values for respective one or more free variables in the given rule according to matches between the given program statement and a program statement pattern of the given rule;
   (b) substituting the one or more values into a state values pattern of the given rule, wherein the substituting generates a clause;
   (c) in the clause, quantifying over any remaining free variables; and
   (d) adding the clause to the plurality of clauses.

2. The method of claim 1 wherein:
   the computer program source code is for a first computer program;
   the specification comprises state-of-interest information, propagation rule information, and annotation syntax information; and
   a programmable specification tool generates the specification.

3. The method of claim 2 further comprising generating a second specification in the programmable specification tool for a second computer program, the second specification comprising modified state-of-interest information.

4. The method of claim 2 further comprising generating a second specification in the programmable specification tool for a second computer program, the second specification comprising modified propagation rule information.

5. The method of claim 2 further comprising generating a second specification in the programmable specification tool for a second computer program, the second specification comprising modified annotation syntax information.

6. The method of claim 1 wherein the specification comprises annotation syntax information, and wherein the annotation syntax information comprises annotation rules for creating documentation outside the computer program source code.

7. The method of claim 1 wherein the specification comprises state-of-interest information, propagation rule information, and annotation syntax information, wherein the state-of-interest information comprises buffer state information, and wherein the annotation syntax information comprises syntax rules for buffer state annotations.

8. The method of claim 1 wherein the specification comprises state-of-interest information, propagation rule information, and annotation syntax information, wherein the state-of-interest information comprises function parameter information, and wherein the annotation syntax information comprises syntax rules for contract annotations.

9. The method of claim 1 further comprising:
   based on a measure of relative soundness of the inferring the one or more annotations, refining the specification with a programmable specification tool; and
   inferring one or more annotations based at least in part on the refined specification.

10. The method of claim 9 wherein the refining the specification comprises modifying one or more features of the specification selected from the group consisting of: state-of-interest information, propagation rule information, annotation syntax information.

11. The method of claim 1 further comprising:
   based on a measure of relative completeness of the inferring the one or more annotations, refining the specification with a programmable specification tool; and inferring one or more annotations based at least in part on the refined specification.

12. One or more computer-readable storage media having encoded thereon computer-executable instructions for performing a method of annotating computer program source code, the method comprising:
receiving the computer program source code, wherein the computer program source code comprises a plurality of program statements;
in an annotation inference engine, receiving a specification, wherein the specification comprises one or more rules comprising a program statement pattern that specifies when to generate clauses, and a state values pattern that specifies clauses to generate;
applying the specification to the computer program source code, thereby generating a plurality of clauses; and
inferring one or more annotations on one or more annotation targets in the computer program source code based at least in part on the plurality of clauses;
wherein the one or more rules are generated with a programmable description tool separate from the annotation inference engine; and
wherein the inferring comprises performing (a)-(d) on at least one given program statement for a given rule out of the one or more rules applied responsive to determining that the given program statement matches the program statement pattern of the given rule, wherein the given program statement comprises a branch statement, an assignment statement, or a function entry statement:
(a) in the given program statement, finding one or more values for respective one or more free variables in the given rule according to matches between the given program statement and a program statement pattern of the given rule;
(b) substituting the one or more values into a state values pattern of the given rule, wherein the substituting generates a clause;
(c) in the clause, quantifying over any remaining free variables; and
(d) adding the clause to the plurality of clauses.

13. The computer-readable storage media of claim 12 wherein the method further comprises:
receiving annotation syntax rules along with a state description and a propagation rule description.

14. The computer-readable storage media of claim 13 wherein the inferring the one or more annotations on the one or more annotation targets in the computer program source code is based at least in part on the received annotation syntax rules, and wherein the annotation syntax rules are generated with the programmable description tool separate from the annotation inference engine.

15. The computer-readable storage media of claim 13 wherein the annotation syntax rules comprise rules for generating buffer-related annotations.

16. The computer-readable storage media of claim 13 wherein the annotation syntax rules comprise rules for generating precondition annotations and postcondition annotations.

17. The computer-readable storage media of claim 12 wherein at least one of the one or more annotation targets is a data structure comprising plural fields, and wherein at least one of the one or more annotations applies to more than one of the plural fields of the data structure.

18. A special-purpose computer programmed with stored computer-executable instructions for performing a method of annotating computer program source code, the method comprising:
receiving the computer program source code, wherein the computer program source code comprises a plurality of program statements;
receiving a specification, wherein the specification comprises one or more rules comprising a program statement pattern that specifies when to generate clauses, and a state values pattern that specifies clauses to generate;
applying the specification to the computer program source code, thereby generating a plurality of clauses;
based on the clauses, inferring one or more annotations for the computer program source code; and
annotating the computer program source code with the one or more annotations;
wherein the inferring comprises performing (a)-(d) on at least one given program statement for a given rule out of the one or more rules applied responsive to determining that the given program statement matches the program statement pattern of the given rule, wherein the given program statement comprises a branch statement, an assignment statement, or a function entry statement:
(a) in the given program statement, finding one or more values for respective one or more free variables in the given rule according to matches between the given program statement and a program statement pattern of the given rule;
(b) substituting the one or more values into a state values pattern of the given rule, thereby generating a clause;
(c) in the clause, quantifying over any remaining free variables; and
(d) adding the clause to the plurality of clauses;
wherein the inferring the one or more annotations comprises:
inferring a first pointer parameter is an input parameter, indicating an implicit contract that the first pointer parameter is either null or points to initialized data at function entry, and annotating the first pointer parameter to indicate that the first pointer parameter is an input parameter;
inferring a second pointer parameter is an output parameter, indicating an implicit contract that the second pointer parameter is either null or points to memory that may be written to, and that is guaranteed to be initialized at function exit, and annotating the second pointer parameter to indicate that the second pointer parameter is an output parameter; and
inferring a third pointer parameter is a required parameter, indicating an implicit contract that the third pointer parameter must not be null, and annotating the third pointer parameter to indicate that the third pointer parameter is a required parameter.

19. The special-purpose computer of claim 18 further comprising a tool for generating the specification and a tool for applying the specification to the computer program source code;
wherein the tool for generating the specification is separate from the tool for applying the specification to the computer program source code.

* * * * *